United States Patent [19]

Pastrick

[11] Patent Number: 5,497,306
[45] Date of Patent: Mar. 5, 1996

[54] EXTERIOR VEHICLE SECURITY LIGHT

[75] Inventor: Todd W. Pastrick, Spring Lake, Mich.

[73] Assignee: Donnelly Corporation, Holland, Mich.

[21] Appl. No.: 426,591

[22] Filed: Apr. 21, 1995

Related U.S. Application Data

[63] Continuation-in-part of Ser. No. 333,412, Nov. 2, 1994, which is a continuation of Ser. No. 11,947, Feb. 1, 1993, Pat. No. 5,371,659.

[51] Int. Cl.⁶ ........................................ B60Q 1/26
[52] U.S. Cl. .......................... 362/83.1; 362/226
[58] Field of Search ................................ 362/83.1, 135, 362/140, 141, 226

[56] References Cited

U.S. PATENT DOCUMENTS

| | | |
|---|---|---|
| 1,563,258 | 11/1925 | Cunningham . |
| 2,273,570 | 2/1942 | Greenlees . |
| 2,562,687 | 7/1951 | Anderson . |
| 3,596,079 | 7/1971 | Clark . |
| 4,041,301 | 8/1977 | Pelchat . |
| 4,205,325 | 5/1980 | Haygood et al. . |
| 4,258,352 | 3/1981 | Lipschutz . |
| 4,274,078 | 6/1981 | Isobe et al. . |
| 4,342,210 | 8/1982 | Denningham . |
| 4,446,380 | 5/1984 | Moriya et al. . |
| 4,475,100 | 10/1984 | Duh . |
| 4,688,036 | 8/1987 | Hirano et al. . |
| 4,809,137 | 2/1989 | Yamada . |
| 4,866,417 | 9/1989 | DeFino et al. . |
| 4,881,148 | 11/1989 | Lambropoulos et al. . |
| 4,890,907 | 1/1990 | Vu et al. . |
| 4,916,430 | 4/1990 | Vu et al. . |
| 5,014,167 | 5/1991 | Roberts . |
| 5,017,903 | 5/1991 | Krippelz, Sr. . |
| 5,038,255 | 8/1991 | Nishihashi et al. ............... 362/226 |
| 5,049,867 | 9/1991 | Stouffer . |
| 5,113,182 | 5/1992 | Suman et al. . |
| 5,132,882 | 7/1992 | Alder ................... 362/226 |
| 5,151,824 | 9/1992 | O'Farrell . |
| 5,179,471 | 1/1993 | Caskey et al. . |
| 5,207,492 | 5/1993 | Roberts . |
| 5,313,335 | 5/1994 | Gray et al. ................... 362/83.1 |
| 5,371,659 | 12/1994 | Pastrick et al. . |

FOREIGN PATENT DOCUMENTS

| | | |
|---|---|---|
| 3803510 | 9/1988 | Germany . |
| 0188242 | 8/1986 | Japan . |
| 0218248 | 9/1987 | Japan . |
| 0239273 | 9/1989 | Japan . |

*Primary Examiner*—Carroll B. Dority
*Attorney, Agent, or Firm*—Van Dyke, Gardner, Linn & Burkhart

[57] ABSTRACT

A mirror assembly security system for a vehicle includes an exterior mirror assembly and a light module removably positioned within the exterior mirror housing. The light module is moisture impervious and includes an enclosure, a light-transmitting opening in the enclosure facing generally downwardly and/or rearwardly of the vehicle, a cover for the light-transmitting opening, and a light source in the enclosure radiating light through the light-transmitting opening. The light source may be received in a socket which removably engages another opening in the enclosure. In this manner, the light source may be replaced by removing the module from the exterior mirror housing, removing the socket from the enclosure and replacing the light source. The enclosure and mirror housing preferably are configured to self-retain the module in the exterior mirror moving with no, or fewer than one or two, separate fasteners.

106 Claims, 16 Drawing Sheets

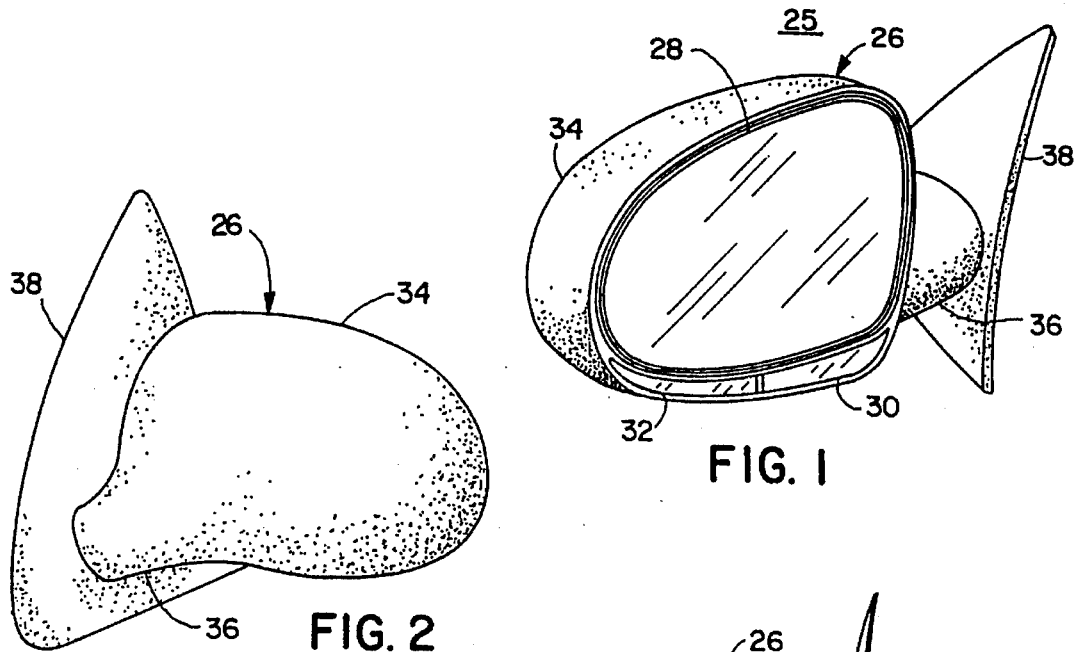
FIG. 1
FIG. 2
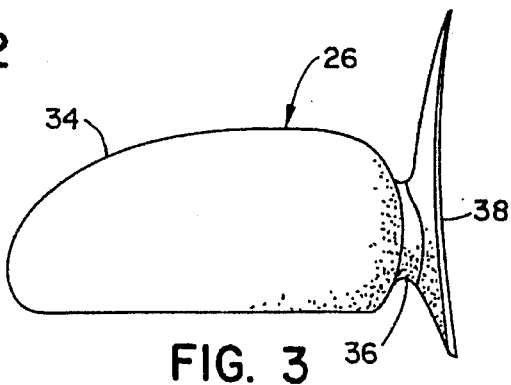
FIG. 3
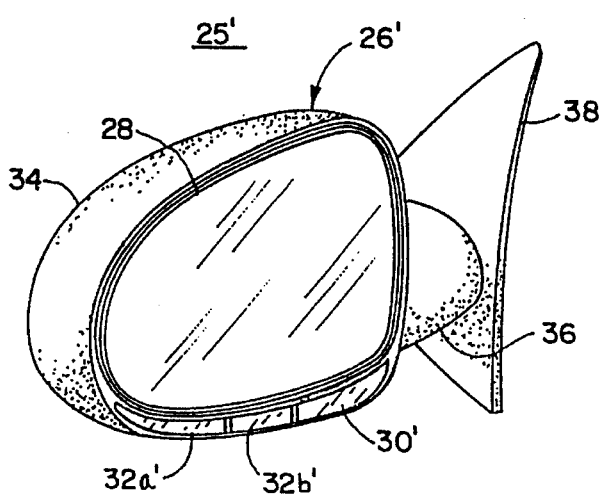
FIG. 4

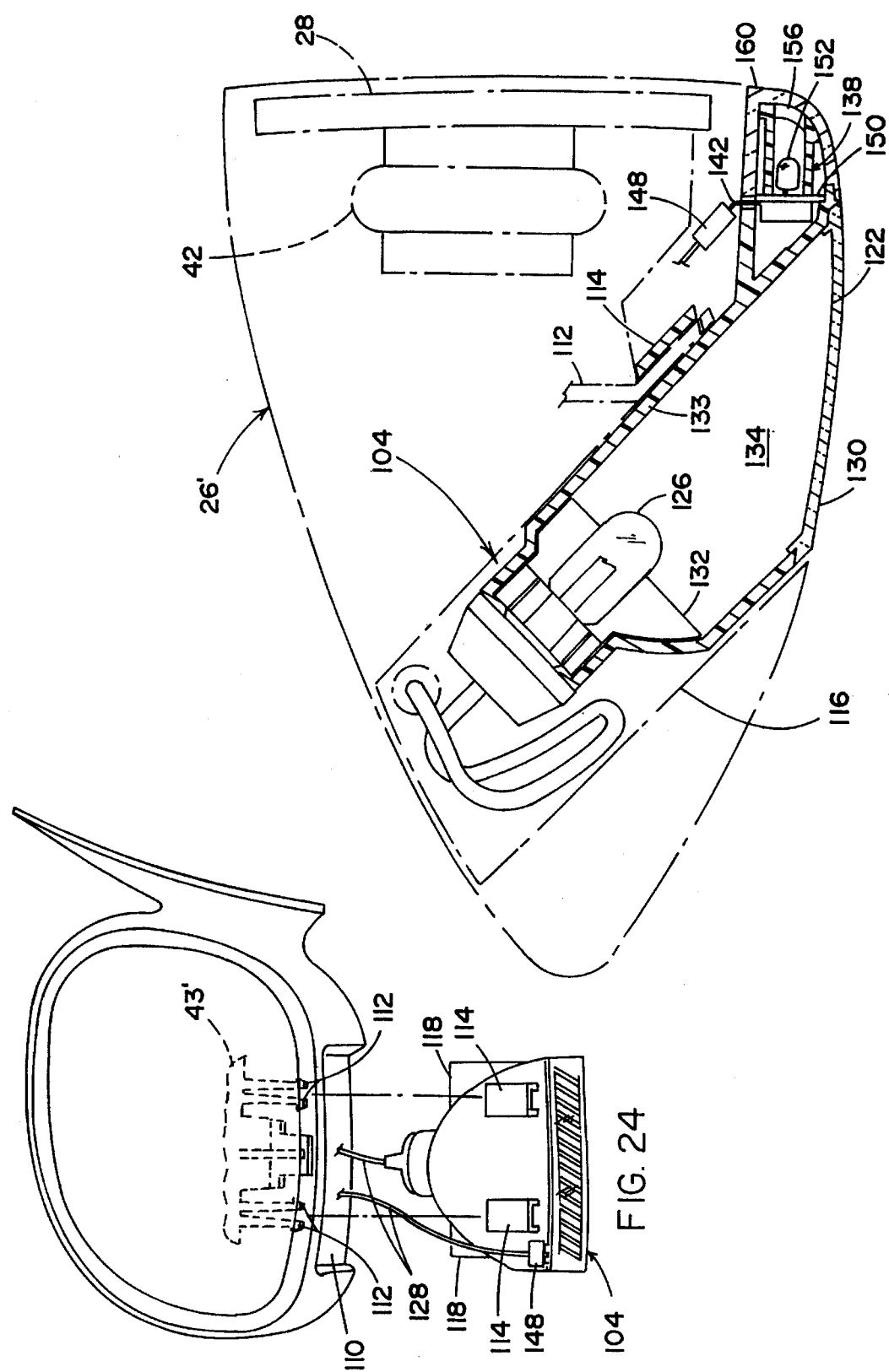

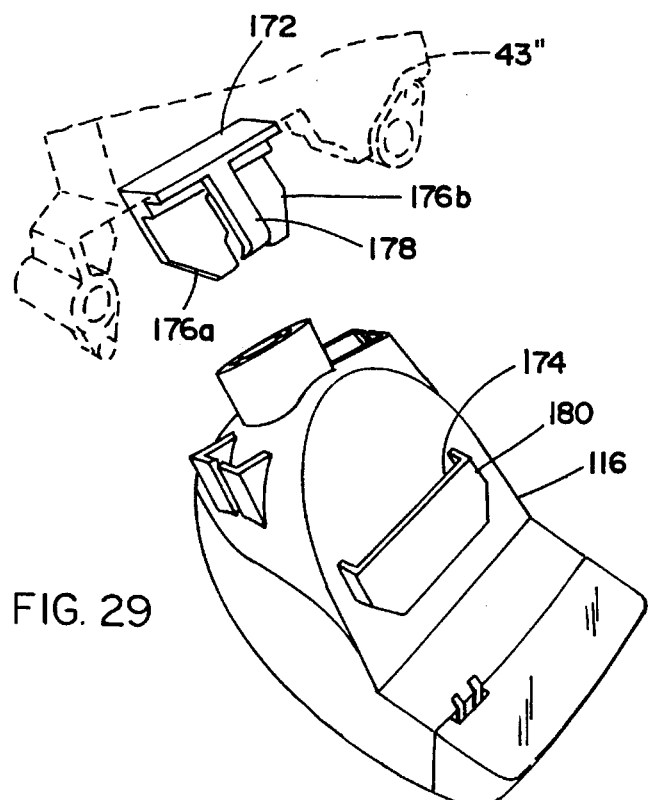
FIG. 29
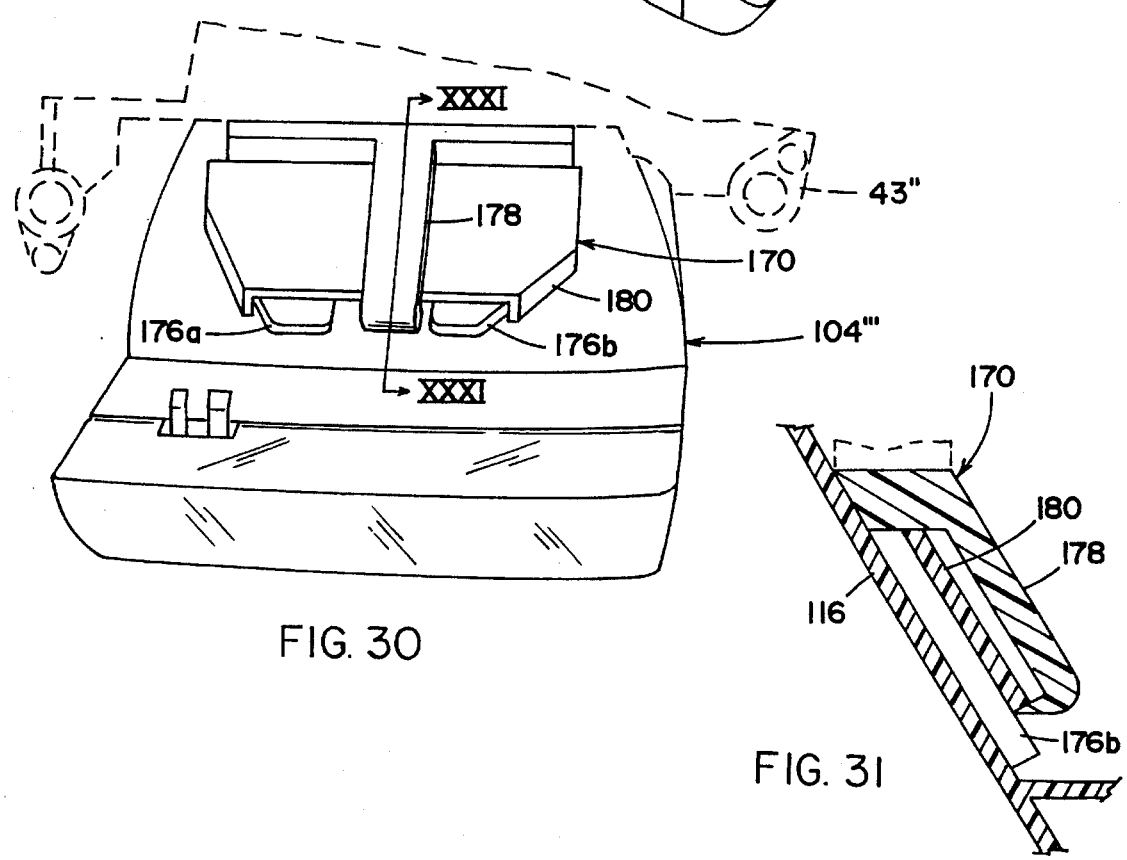
FIG. 30
FIG. 31

EXTERIOR VEHICLE SECURITY LIGHT

RELATED APPLICATIONS

This application is a continuation in part of pending application Ser. No. 08/333,412 filed Nov. 2, 1994, which is a continuation of application Ser. No. 08/011,947 filed Feb. 1, 1993, now U.S. Pat. No. 5,371,659.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

In order to include a security light system in a vehicle exterior mirror assembly, the security light must be rugged and resistant to environmental conditions such as water splash from road surfaces, rain and other precipitation as well as car washes. The assembly desirably must additionally be of relatively low cost and easy to manufacture in order to be acceptable to vehicle manufacturers. In addition, the security light desirably must be capable of matching a multiplicity of mirror housing designs. Moreover, the security light desirably is compact so as to fit into the interior cavity of conventional exterior mirror housings. For styling and aerodynamic reasons, exterior mirror housings are of determined and restricted size, shape, design, and interior volume. Moreover, the interior volume is already typically relatively cramped as it must accommodate not only the mirror reflector element itself and its movement, but also usually a manual or electric actuator that allows adjustment of the rearward field of view of the reflector remotely by the driver from the interior cabin of the vehicle. Also, since it is commercially desirable for a manufacturer of a security light to supply to a multitude of exterior mirror manufacturers, for their incorporation into their own particular exterior mirror assembly construction, it is desirable that the light be of a module type that is compact; that is weatherproofed; that is attachable and receivable by a wide variety of exterior mirror assembly designs; that is readily, standardly, and conveniently connectable to the vehicle electrical service and wiring already commonly found in conventional exterior mirror assemblies; and that is economic both for manufacture by the light module manufacturer and for the manufacturer of the complete exterior mirror assembly who will incorporate the light module into a mirror housing.

Importantly, the security light must be easy to service. The vehicle repair technician must be provided with easy access to the light source in order to replace the light source during the useful life of the vehicle. Furthermore, the light source should be replaceable without removing and subsequently replacing numerous fasteners. Such fasteners are not only time-consuming to remove and replace, but are subject to getting lost as well as damaged. Most or all of the above requirements must be met in order to have a commercially viable vehicle exterior mirror assembly security system suitable for use on a vehicle, such as an automobile. Indeed, the Applicants do not know of any successful commercial incorporation of a light module into an exterior mirror assembly on an automobile and believe that their inventions are the first commercially successful applications of a light module suitable for use in the exterior mirror assembly on an automobile.

SUMMARY OF THE INVENTION

The present invention is intended to provide a personal safety feature for a vehicle in the form of a light adapted to projecting light generally downwardly on an area adjacent a portion of the vehicle in order to create a lighted security zone in the area. Advantageously, the light, that preferably provides a security function, is provided as a module that is suitable for use in the exterior mirror housing designs of various vehicles. The light module is capable of low cost, easy manufacture. Furthermore, the module is compact and is substantially moisture impervious in order to resist environmental forces. Advantageously, the light module is easy to service in order to replace the light source by requiring a minimum of, preferably one or no, fasteners in order to remove the module from the exterior mirror assembly. Furthermore, the invention encompasses a signal light module with the advantages described above and with the signal light generating a light pattern discernable to drivers of overtaking vehicles but largely imperceptible to the driver of the vehicle on which the signal light itself is mounted.

According to an aspect of the invention, a mirror assembly security system for a vehicle includes an exterior mirror assembly having a reflective element and a housing for the reflective element. A light module is removably positioned within the housing. The light module projects light from the housing on an area adjacent a portion of the vehicle, preferably in order to create a lighted security zone in that area. The light module includes an enclosure, a light-transmitting opening in the enclosure facing downwardly or rearwardly of the vehicle, or both, a cover for the light-transmitting opening, and a light source in the enclosure. The light module may further include a serviceable, removable light source receiving means, such as a socket positioned in another opening in the enclosure and a gasket for sealing the socket in the opening, or with the mating surface of the socket to the opening being self-gasketing. In this manner, the light source can be replaced by removing the light module from the exterior mirror housing and removing the socket from the light module. The light module and the mirror housing may have mating surface configurations, which at least partially retain the light module in the housing. This may eliminate the requirement for multiple fasteners which must be removed in order to service the light module.

The light module may further include a second light-transmitting opening in the enclosure facing rearwardly of the vehicle, a second cover for the second light-transmitting opening, and a second light source in the second enclosure radiating light through the second light-transmitting opening. This feature may provide a signal light for use as either a turn signal, a brake signal, or both, visible from the side of the equipped vehicle. In a preferred embodiment, the second light source is a plurality of light-emitting diodes and includes louvers between the light-emitting diodes. The louvers may be skewed in a direction away from the vehicle passenger compartment in order to shield the driver from light radiated by the light-emitting diodes.

The light module is preferably substantially moisture impervious in order to be resistant to environmental elements. The enclosure is preferably a unitary assembly with the lens covering the light-transmitting opening permanently joined with the remainder of the enclosure. The light source is preferably serviceably, movably received within the enclosure by a socket that engages in an opening in the enclosure. In this manner, the light source may be replaced by removing the light module from the exterior mirror housing, removing the socket from the enclosure and replacing the light source in the socket.

The invention provides a universal configuration for a mirror assembly security system, which allows the vehicle manufacturer to offer a mirror assembly system having only the security light feature, which projects light from the housing on an area adjacent a portion of the vehicle in order, for example, to create a lighted security zone in that area. Alternatively, the invention allows the vehicle manufacturer to offer a mirror assembly having an additional or a stand-alone signal light; for example, a turn signal, a brake light, or both a turn signal and a brake light. The signal light increases security for the vehicle occupant by providing signals to vehicles overtaking the equipped vehicle from the side. The signal light may be designed to be observed by other vehicles passing the equipped vehicle, but not directly by the driver of the equipped vehicle.

The security system is adapted to projecting a pattern of light from the exterior mirror housing on an area adjacent a portion of the vehicle that extends laterally onto the vehicle and downwardly and rearwardly of the vehicle. In this manner, a security zone is established in the vicinity of the vehicle doors where occupants enter and exit the vehicle. The signal light is adapted to projecting a pattern of light extending laterally away from the vehicle and rearwardly of the equipped vehicle. In this manner, the pattern generated by the signal light cannot be substantially observed by a driver of the equipped vehicle. However, the pattern generated by the signal light may be observed by a driver of another vehicle passing the vehicle equipped according to the invention.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The invention, further, conveniently combines a signal light that acts in unison with the vehicle's turn signal, brake light, or both, with the security light, or as a stand-alone accessory, in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWINGS

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view as FIG. 1 of an alternative embodiment of the invention;

FIG. 23 is a sectional view taken along the lines XXIII—XXIII in FIG. 22;

FIG. 24 is a front elevation of the mirror assembly in FIGS. 21 and 22 illustrating the manner in which a light module is removably mounted to an exterior rearview mirror housing;

FIG. 29 is the same perspective view as FIG. 22 of another alternative embodiment;

FIG. 30 is a front elevation of the mirror assembly in FIG. 29 illustrating the light module mounted to the support bracket; and FIG. 31 is a sectional view taken along the lines XXXIII—XXXIII in FIG. 30.

DESCRIPTION OF THE PREFERRED EMBODIMENT

Figure 5:
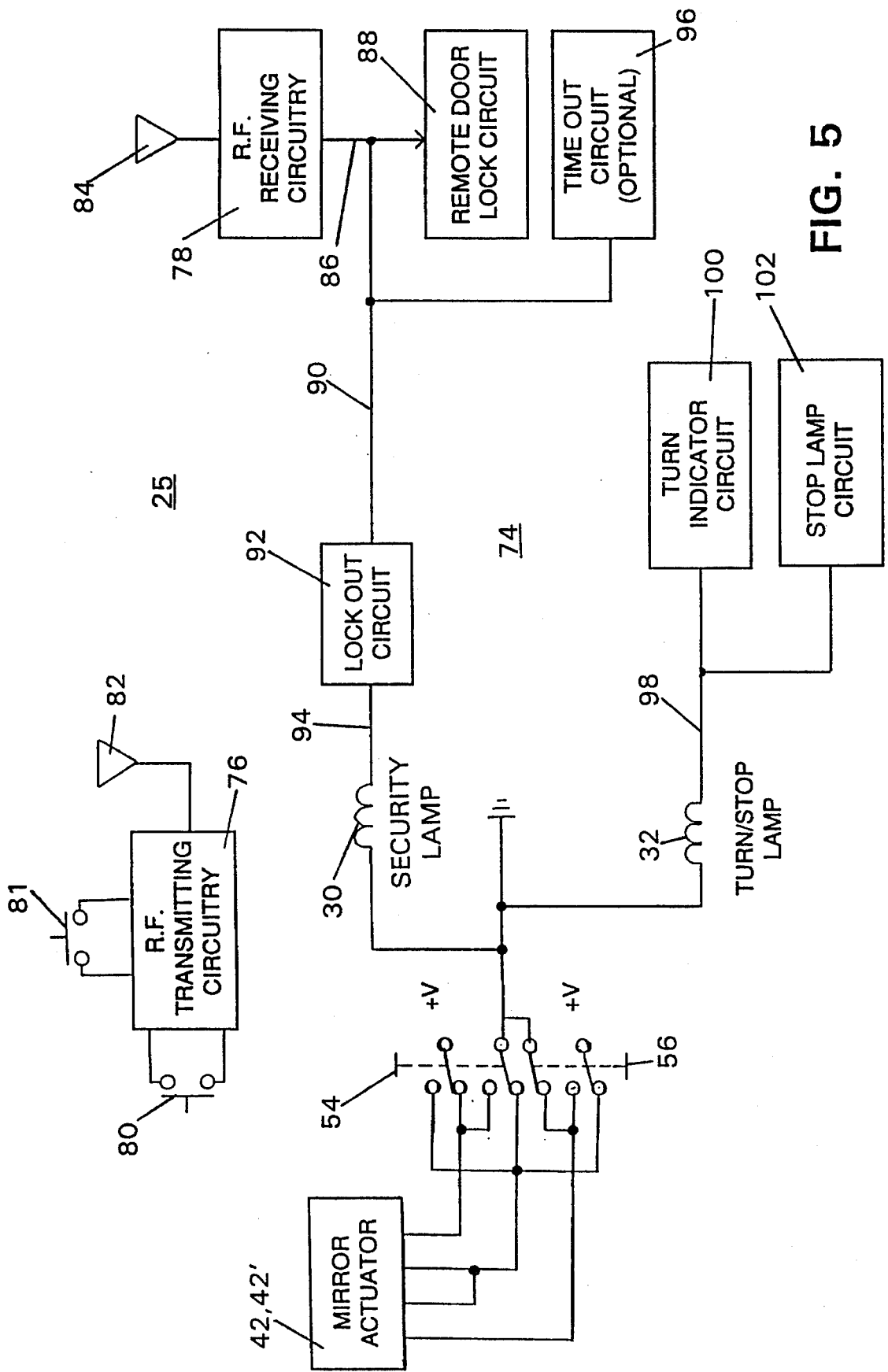
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red or red-orange, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

Figure 7:
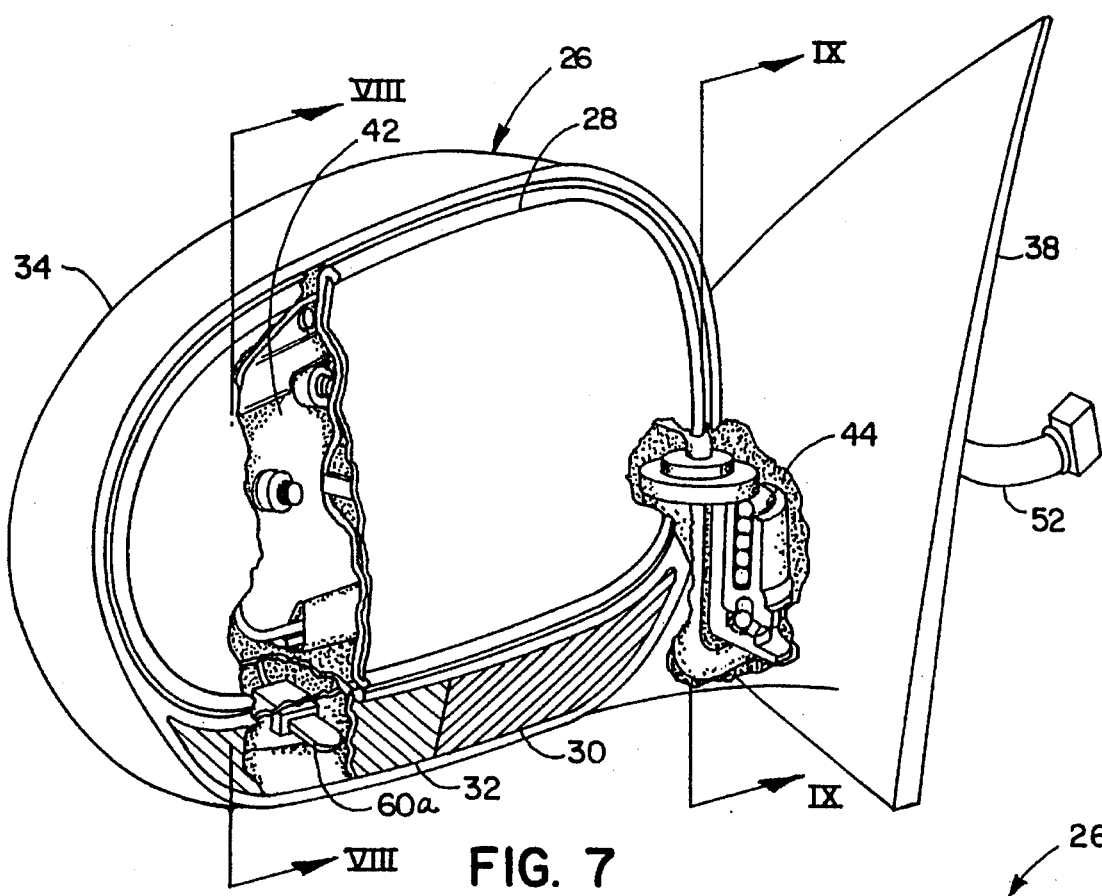
FIG. 7 is a breakaway perspective view of the system in FIG. 1 revealing internal components thereof.
Figure 9:
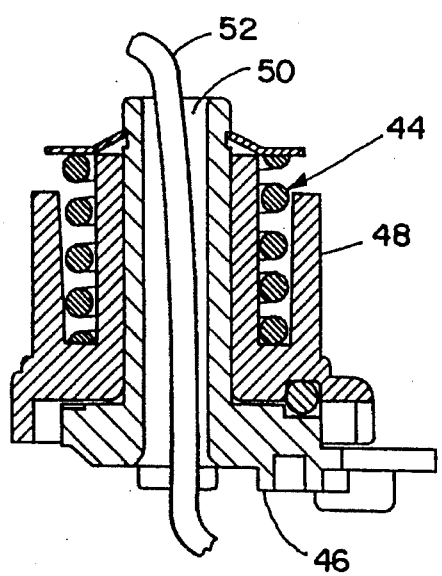
FIG. 9 is a sectional view taken along the lines IX—IX in FIG. 7.
Figure 8:
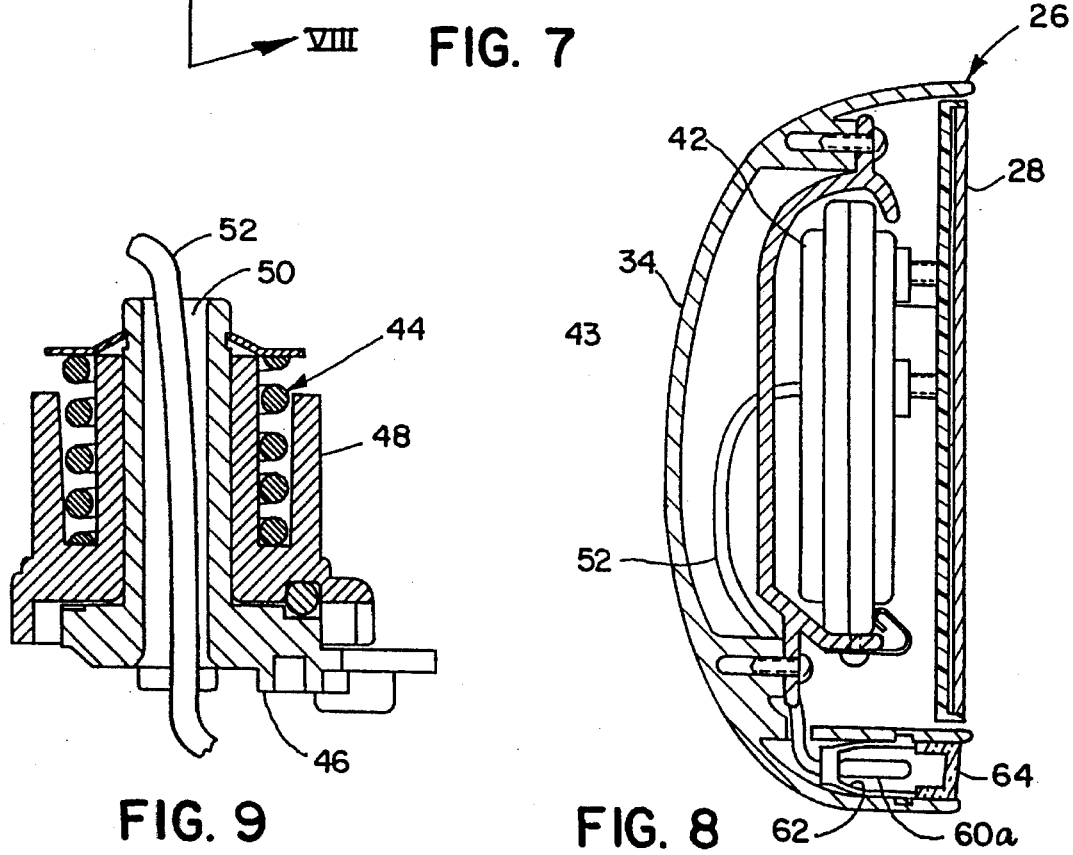
FIG. 8 is a sectional view taken along the lines VIII—VIII in FIG. 7.
Figure 20:
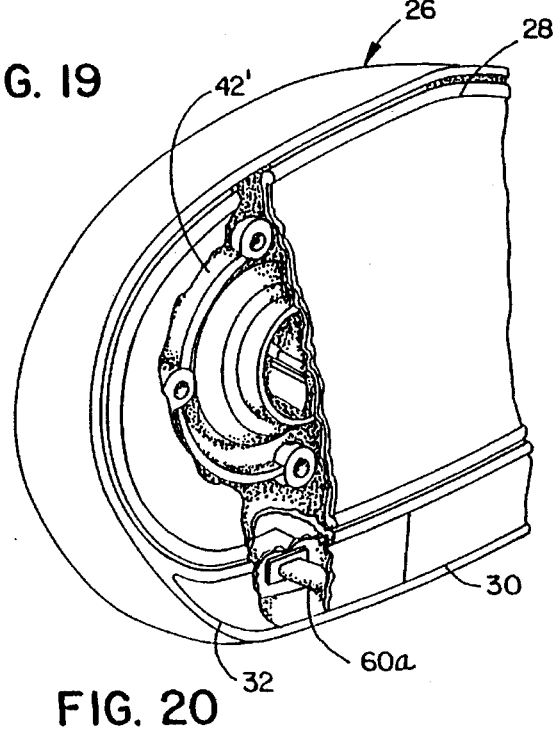
FIG. 20 is the same view as FIG. 7 of the invention embodied in an alternative mirror structure.

With reference to FIGS. 7 and 8, as is conventional, reflectance element 28 is mounted to a bracket 43 by a positioning device such as an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industile Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater 53 as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Figure 10:
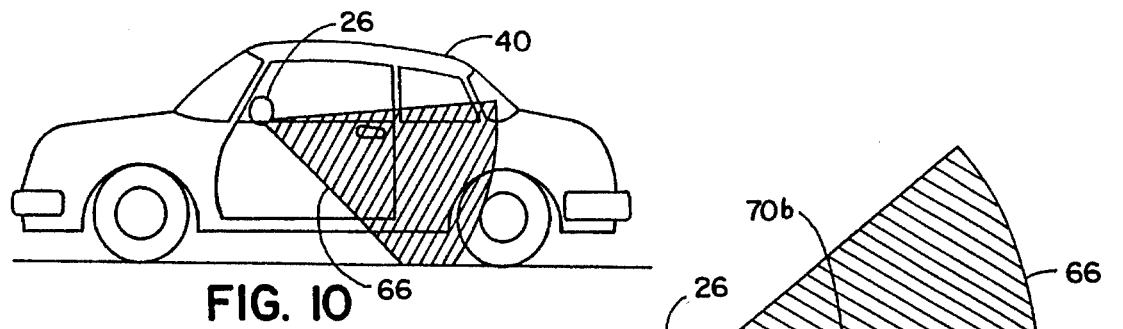
FIG. 10 is a side elevation of a vehicle illustrating the security zone light pattern generated by a security light according to the invention.
Figure 11:
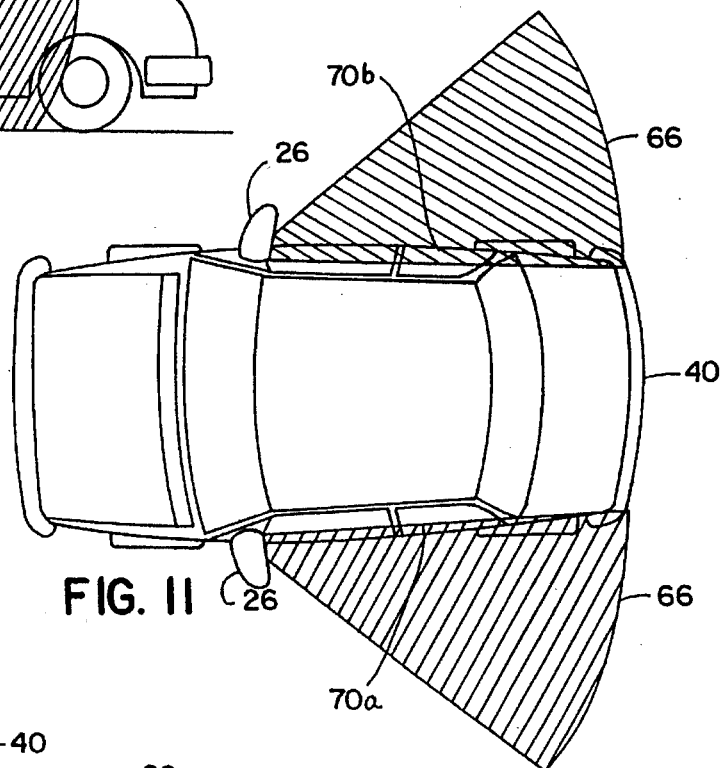
FIG. 11 is a top plan view of the vehicle and light pattern in FIG. 10.
Figure 12:
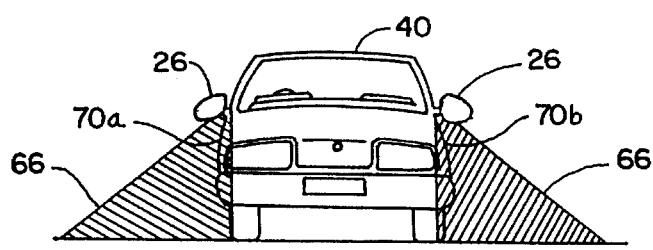
FIG. 12 is a rear elevation of the vehicle and light pattern in FIG. 10.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10–12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 13:
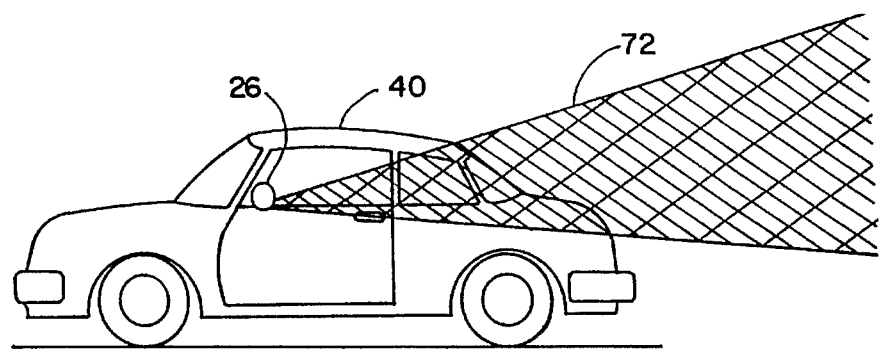
FIG. 13 is a side elevation of a vehicle illustrating the light pattern generated by a signal light useful with the invention.
Figure 14:
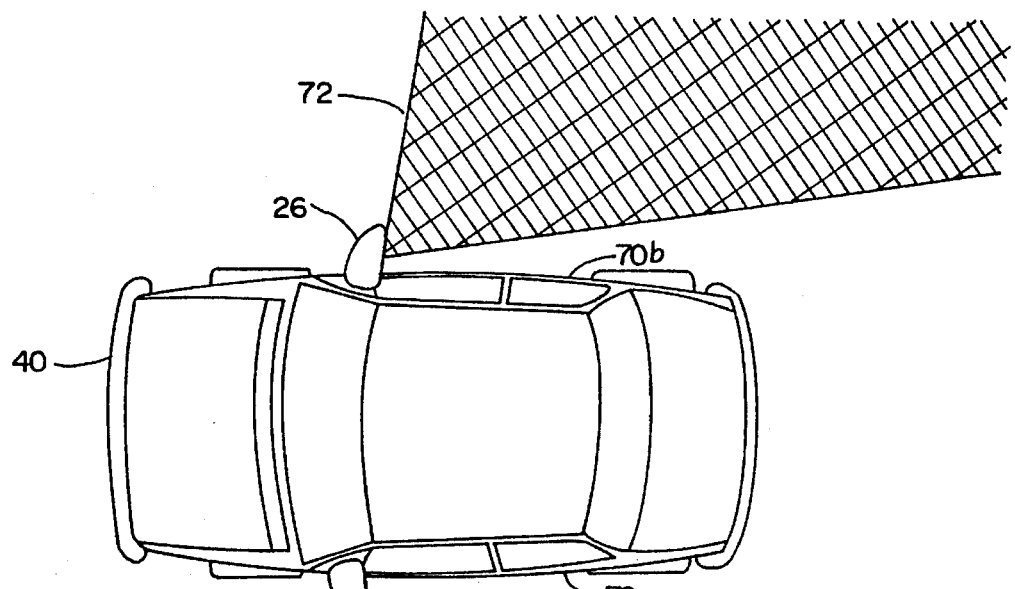
FIG. 14 is a top plan view of the vehicle and light pattern in FIG. 13.
Figure 15:
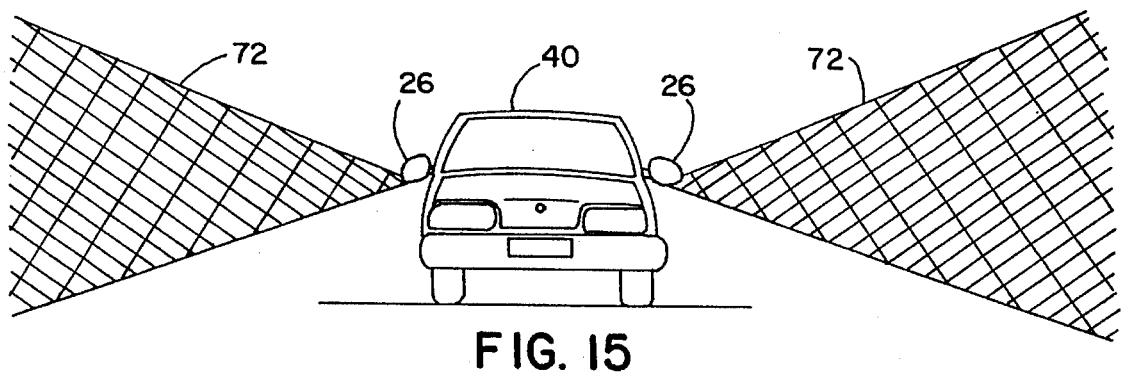
FIG. 15 is a rear elevation of the vehicle and light pattern in FIG. 13.

Signal light 32 generates a light pattern 72, which is directed generally horizontally rearwardly of vehicle 40 (FIGS. 13–15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in the illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, interior cabin, or within or on a mirror assembly, and includes an output 86 in order to operate remote door lock circuit 88, as is conventional. For example, an antenna, such as a metallic antenna comprising, for example, 6 to 20 gauge copper wire, and/or an RF, IR, and the like signal receiving circuit, may be incorporated into one, and preferably both, of the exterior mirror assemblies, or into the interior mirror assembly, or into vehicle glazing, trim items such as sunvisors and overhead consoles, and their like. Such an antenna can be auxiliary mounted, integrally mounted, or insert molded into or onto, for example, the exterior mirror bracket, sail, housing, bezel, or visor, or could be part of the light module. Such receiving system can be of the automatic, proximity detection type that automatically senses proximity and approach of the vehicle owner by its automatic detection of the transducer carded by the vehicle owner, without that vehicle owner having necessarily to operate neither a button on a hand-held unit. Also, the receiver may be part of, or itself be, a proximity detection system that activates and illuminates the light module of this invention whenever the vehicle is approached under conditions where vehicle security is being detected and protected.

Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. The lockout circuit may also be included in the vehicle's ignition system, such that the security light is disabled when the engine is started and the vehicle is operating. Thus, the lamp will be off when the ignition switch is turned to start the engine. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
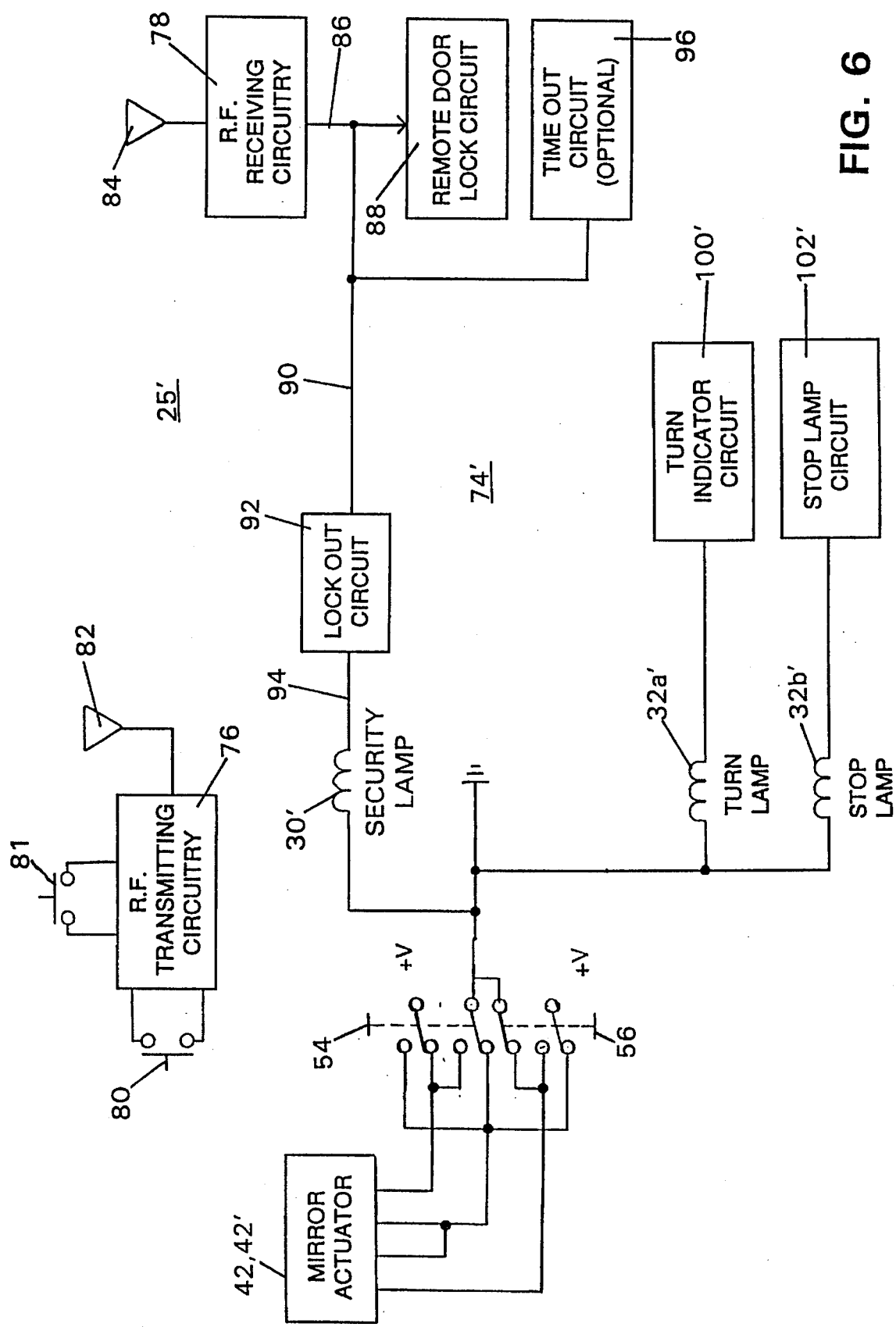
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red, red-orange or amber, as desired by the automaker, and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
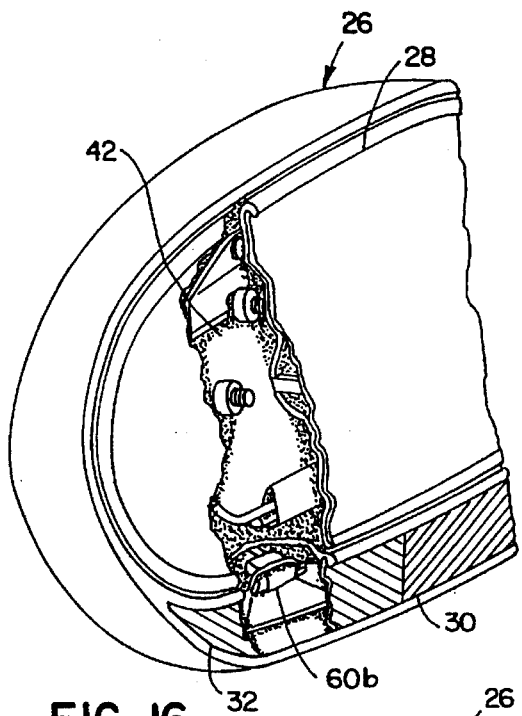
FIG. 16 is the same view as FIG. 7 of a first alternative light source according to the invention.
Figure 17:
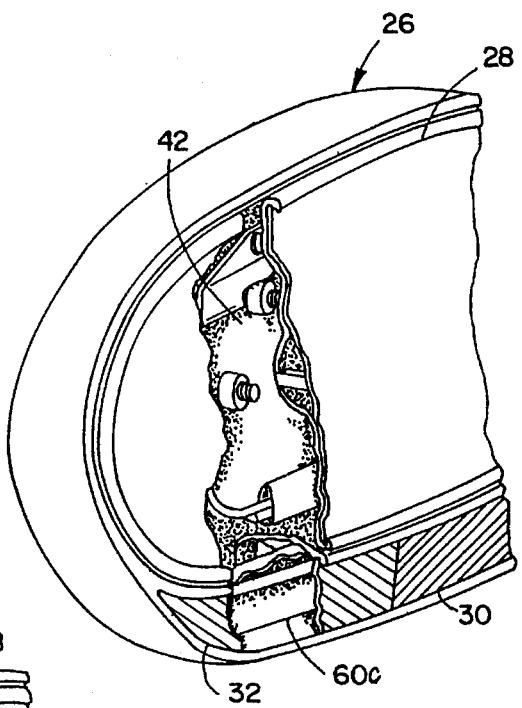
FIG. 17 is the same view as FIG. 7 of a second alternative light source.
Figure 18:
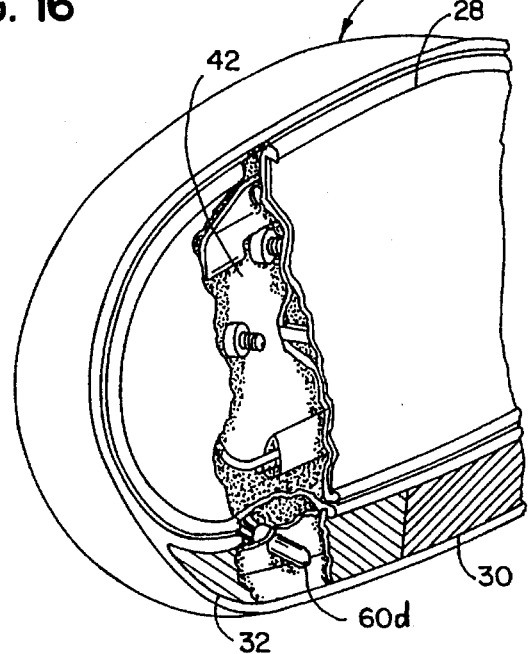
FIG. 18 is the same view as FIG. 7 of a third alternative light source.
Figure 19:
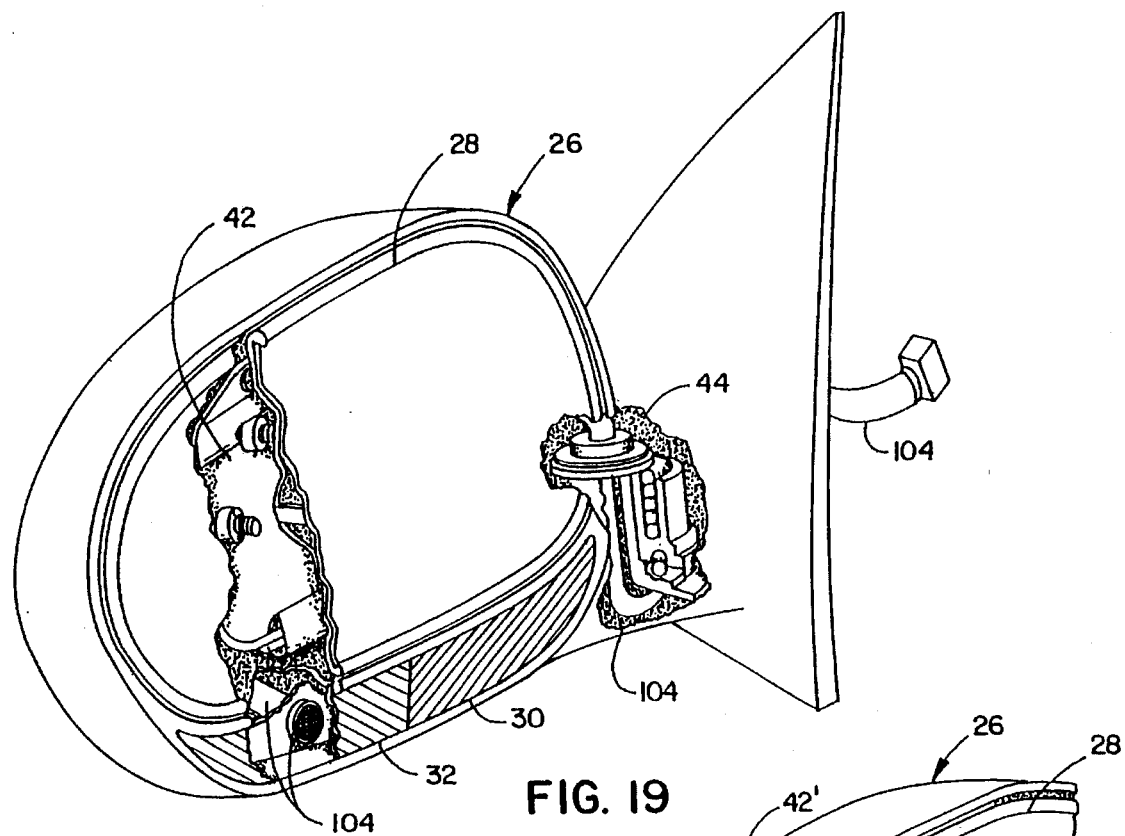
FIG. 19 is the same view as FIG. 7 of a fourth alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light-emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a clear lens, a diffuser lens, a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Figure 21:
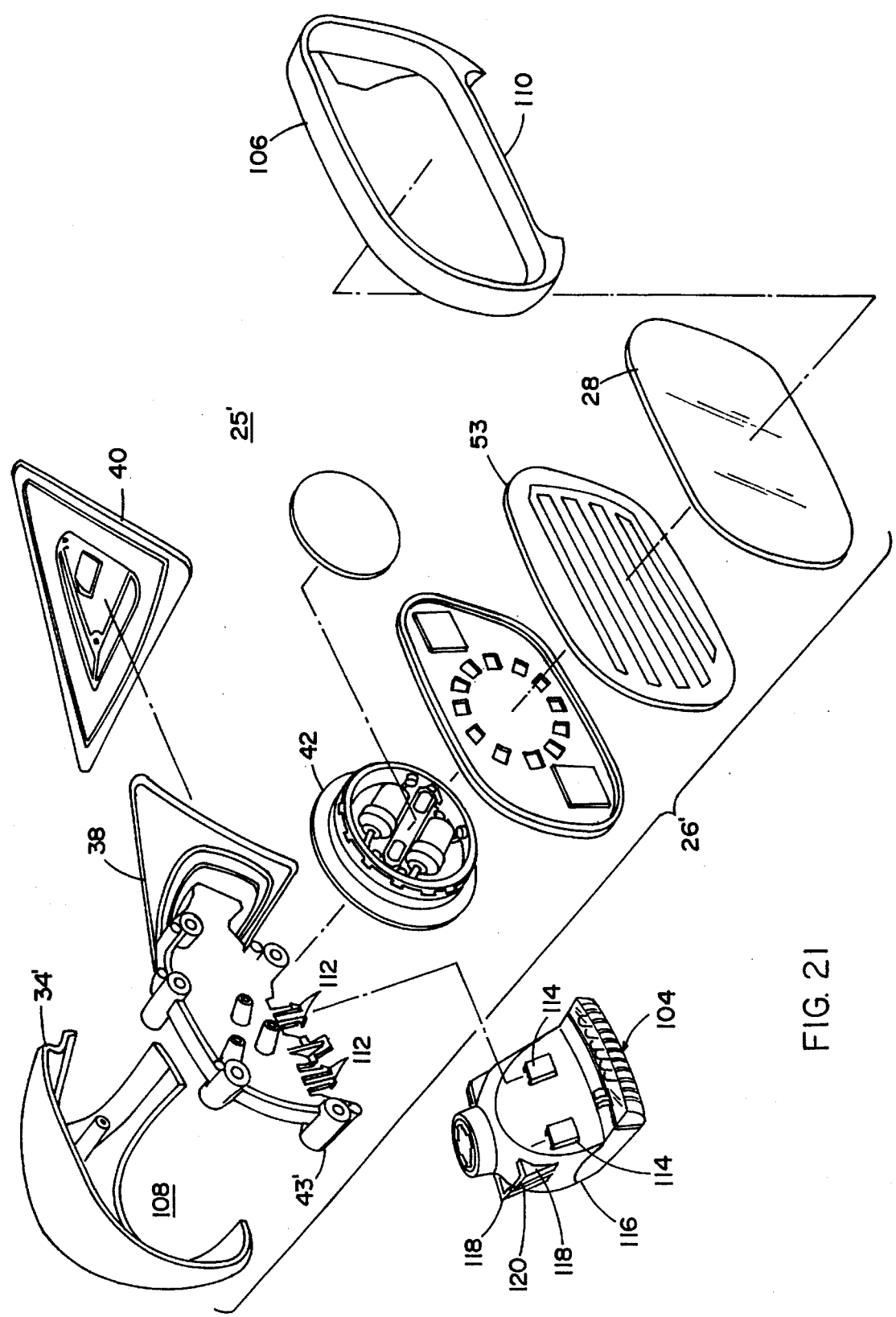
FIG. 21 is an exploded perspective view taken from the front of a mirror assembly (rear of the vehicle), according to another aspect of the invention.
Figure 22:
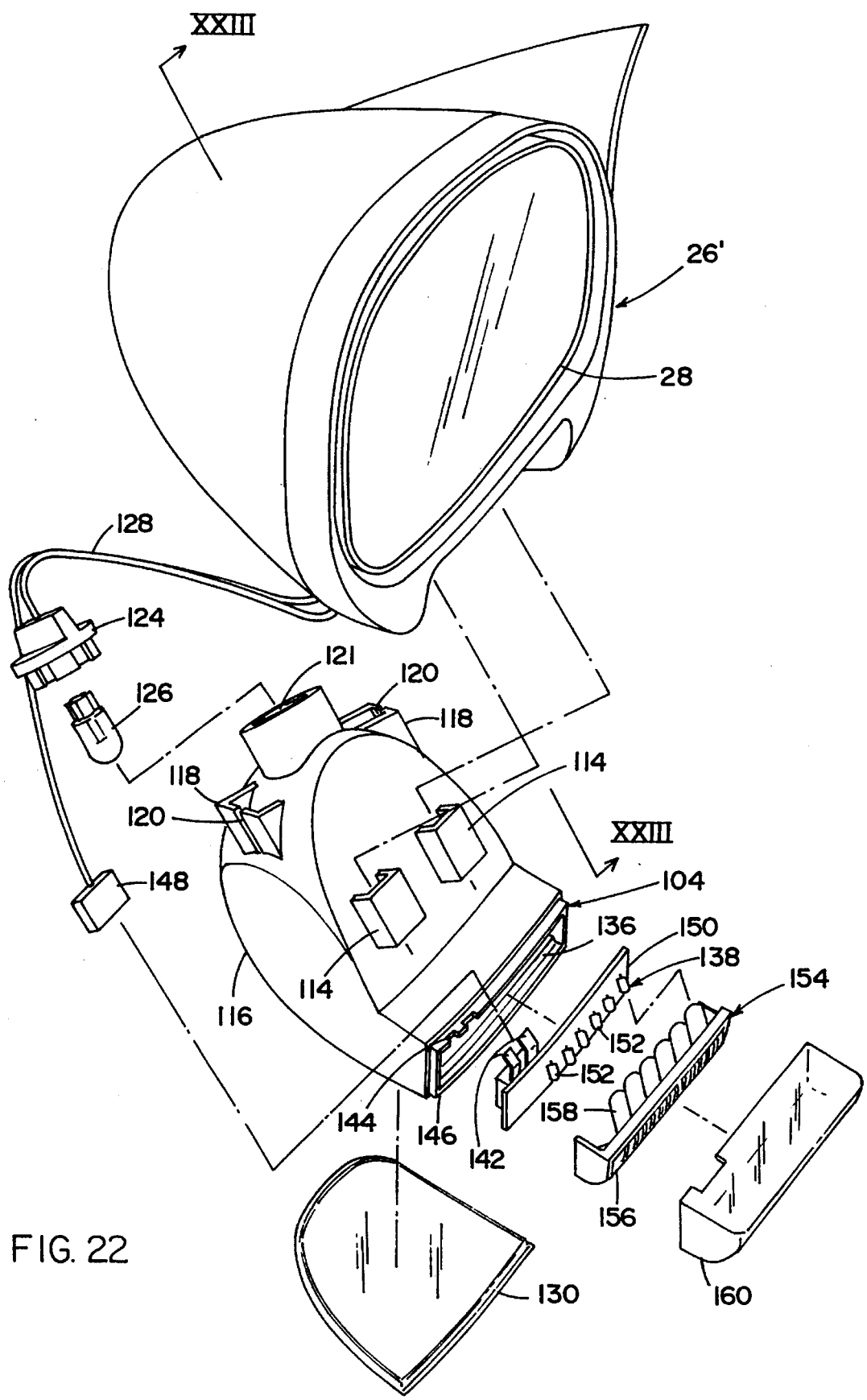
FIG. 22 is an exploded perspective view illustrating details of the light module.

An alternative vehicle personal security lighting system 25' includes a light module 104 that is removably positioned within housing 34' of exterior mirror assembly 26' (FIG. 21). In addition to the opening for accepting bezel or cowling 106, mirror housing 34' includes a downward opening 108 for receiving light module 104. Additionally, bezel 106 includes a recess 110 which defines an opening facing generally downwardly and rearwardly of the vehicle. Exterior mirror assembly 26 includes a bracket 43' for mounting positioning device 42 which mounts reflective element 28. Bracket 43' has two pairs of flexible prongs 112, which are received within sockets 114 defined on an enclosure 116 of light module 104. Prongs 112 releasably engage sockets 114 in order to retain the light module within the exterior mirror assembly in openings 108 and 110. Light module 104 may be disassembled from exterior mirror assembly 26' by reaching behind reflective element 28 with a pair of needle-nose pliers, or the like, and sequentially compressing each of the pairs of prongs 112 in order to release the prongs from sockets 114. Thus, prongs 112 and sockets 114 provide a fastener-less system which retains the light module in the exterior mirror assembly without the use of separate fasteners. A pair of shoulders 118, which define a slot 120 therebetween, engage a protrusion from an inner surface (not shown) of housing 34' in order to assist in stably positioning light module 104 within housing 34'. Alternatively, one or more fasteners, such as screws, clasps, latches, clips, and their like could be used. But, preferably, for ease of serviceability and for consumer acceptability, only one, and at most two, such fastener should be used. A further advantage of a fastener-less system is that it facilitates supply of a light module of this invention for use in a plurality of exterior mirror assemblies manufactured by a multitude of exterior mirror manufacturers with minimum modifications to the complete mirror assembly housing.

Unitary enclosure 116 has a generally downwardly directed light-transmitting opening 122 and an opening 121 for receiving a light socket 124. Light socket 124 provides electrical connection to a light source 126, which is electrically interconnected to the vehicle through a cable 128. The socket may be self-gasketing, achieved by selection of a material in its construction, at least at the mating surface, that achieves a sealing function. Preferably, the socket, either wholly, or partially at least at its mating surface, is a resilient, somewhat flexible polymer material, preferably with a durometer hardness, measured on the SHORE A scale of less than approximately 95, more preferably less than approximately 85, and most preferably less than approximately 75 but preferably of SHORE A hardness greater than about 50, and preferably greater than about 60. Materials appropriate to achieve this, and simultaneously have the physical, mechanical, and high temperature performance needed, include silicone, urethanes, thermoplastic rubbers, and polyvinyl chloride. Preferably, the material used for the self-gasketing socket is capable of withstanding temperatures in use in excess of approximately 200° F. or higher. Alternatively, a rigid construction may be used for the light socket, such as a ceramic, engineering plastic, Bakelite, nylon, polyester, filled polyester, or filled (glass and/or mineral) nylon, if a gasketing material delivering the above properties are used at the point of mating of light socket 124 and enclosure 116. Light socket 124 seals against enclosure 116 by the provision of a gasket, which, in the illustrated embodiment, is provided by the flexible nature of light socket 124. Alternatively, a separate gasket member formed of material such as silicone, neoprene, thermoplastic rubber, EPDM, polypropylene/EPDM alloy and similar elastomeric materials, preferably having the hardness properties listed above, could be inserted between the light socket and the enclosure. Light-transmitting opening 122 is covered by a cover member 130. Cover member 130 is a lens member, which affects the distribution of light emitted from light source 126. In the illustrated embodiment, cover member 130 is a clear optic lens that provides a substantially uniform puddle of light on the illuminated area adjacent the vehicle's door having a relatively wide light pattern, or flood pattern. Alternatively, cover member 130 could be a diffractive optic, a diffusive optic, a refractive optic, a reflective optic, a holographic optic, a binary optic, or a sinusoidal optic. In the illustrated embodiment, light source 126 is an incandescent lamp that is a filament optic having a minimum five-candle power. Such candle power mounted within an exterior mirror assembly of an automobile will preferably produce a ground surface illumination intensity of at least approximately 5 lux or greater, more preferably at least about 10 lux, and most preferably at least about 20 lux. Light source 126 may range in power up to 32-candle power or more. The preferred range is between approximately 5-candle power and approximately 15-candle power. It is desirable to provide as much candle power as possible without creating excessive heat within enclosure 116. If a high wattage lamp is used, a ventilation system is provided. Ventilation techniques are known in the art which allow the passage of air through the cavity 134 in which the light source is positioned while providing a substantially moisture-impervious barrier.

Light module 104 additionally includes a reflector 132 surrounding light source 126, both positioned in a cavity 134, which extends to light-transmitting opening 122. The purpose of the reflector is in order to direct the light from light source 126 into the pattern of light illustrated in FIGS. 10–12. Reflector 132 may be a parabolic reflector, as illustrated in FIG. 23, but may additionally include an extended tunnel in order to provide collimation of the light beam. In the illustrated embodiment, reflector 132 is aluminum or high efficiency aluminum vacuum-deposited on a wall 133 defining cavity 134, with an optional coating of lacquer. Alternatively, wall 133 may be coated with a white paint, such as "Argent" white or a silver paint. Reflector 132 may be a separate member, such as stamped metal or an aluminized glass optic. Alternatively, light source 126 and reflector 132 may be provided as an assembly.

Light module 104 includes a second cavity 140 defined in enclosure 116 and extending to a second light-transmitting opening 136. A signal light assembly 138 is positioned within cavity 140 to radiate light rearwardly with respect to the vehicle. Signal light assembly 138 includes a pair of electrical contacts 142, which protrude through grooves 144 defined in a flange 146 surrounding opening 136. Contacts 142 engage a connector 148, which provides electrical connection between signal light assembly 138 and the vehicle through cable 128 which, in turn, may piggyback or otherwise connect to existing 12-volt battery/ignition wiring already supplied in the housing to service an electrical actuator and/or a defroster heater pad.

Signal light assembly 138 includes a plurality of light-emitting diodes 152 positioned on circuit board 150. A variety of emitting sources may be used as light-emitting source 90, including, but not limited to, very high intensity amber and reddish-orange light-emitting diode (LED) sources, such as solid-state light-emitting diode (LED) sources utilizing double heterojunction AlGaAs/GaAs material technology, such as very high intensity red LED lamps T-1 3/4 (5 mm) HLMP-4 100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under the designation T-1 3/4 (5 mm) HLMT-DL00, HLMT-CH00, HLMT-CL00, HLMT-CH15, HLMT-CL15 and HLMT-DH00 or high power AlInGaP amber and reddish-orange lamps under the designation HLMA-CH00/-CL00, HLMA-DG00/-DH00/-DL00, HLMA-EH20/-EL20, HLMA-KH00/-KL00, and HLMA-QH00/-QL00, or which use InGaAlP material technology available from Toshiba Corporation of Latham, N.Y., such as under the designation TLRH180D or GaAlAs/GaAlAs LED sources available from Sharp Corporation Electronics Components Group such as Model No. GL6UR3 1T and Model No. GL6UR3T which are red LEDs. Light emittance colors provided by such solid-state sources include orange, yellow, amber, red, and reddish-orange, desirably without need of ancillary spectral filters. The preferred solid-state light-emitting diodes, at 25° C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typical, about 700 to about 7000 mcd); operate at a forward current of about 20 mA to about 50 mA; emit with a dominant wavelength (CIE Chromaticity Diagram) of about 530 nm to about 680 nm; and have a viewing angle $2\Theta_{1/2}$ (where $\Theta_{1/2}$ is the off-axis angle where the luminous intensity is one half the peak intensity) of about 5° to about 25°.

A lens assembly 154, which may be a polycarbonate or acrylic material, is positioned over signal light assembly 138. Lens assembly 154 may include a clear or sinusoidal optical surface 156 and a plurality of louvers 158. Louvers 158 and light-emitting diodes 152 are skewed away from the passenger compartment of the vehicle. In the illustrated embodiment, the light-emitting diodes and louvers are skewed at an angle of at least approximately 15°, more preferably approximately 20°, and most preferably approximately 25° to 30° from the longitudinal centerline of the vehicle, but preferably not more than about 45°. The purpose of the skewing is in order to allow the light radiated by the signal light assembly to be visible by drivers in vehicles to the side of vehicle 40, but to be shielded from the driver of the vehicle 40. This features prevents distraction to the driver of the vehicle equipped with the security lighting system. A cover member 160 encloses signal light assembly 138 and sinusoidal optical surface 156 by moisture-tight engagement with flange 146 of enclosure 116. In the illustrated embodiment, light-emitting diodes 152 are individually mounted at an angle on circuit board 150. In an alternative embodiment, light-emitting diodes 152 could be mounted upright, normal to circuit board 150, with the entire signal light assembly mounted at an angle with respect to the vehicle passenger compartment in order to provide proper skewing away from the driver of the vehicle equipped with the mirror assembly security system according to the invention. Also, when desired, a current limiting resistor can be mounted on circuit board 150 in series with the light-emitting diodes 152 to limit current therethrough and to mate to the 12-volt ignition/battery potential servicing the exterior mirror assembly.

Enclosure 116 is made from a heat-resistant material and is substantially moisture impervious. Preferably, a polymer material is used which has a heat distortion temperature (as measured by ASTM D 648 for a 12.7×12.7×6.4 mm specimen and at 1820 kPa) of at least approximately 80° C., more preferably at least approximately 100° C., and most preferably at least approximately 120° C. A mineral-filled or glass-filled nylon or polyester or acrylonitrile butadiene styrene (ABS) polymer may be utilized for enclosure 116. In the illustrated embodiment, enclosure 116 is made from polycarbonate with cover members 130 and 160 made from a polycarbonate or acrylic. The components of enclosure 116 may be assembled by conventional sonic welding, vibration welding, or by the use of suitable adhesives. Enclosure 116 is opaque, except for cover members 130 and 160, in order to shade light. The light module fits within the cavity defined within housing 34' by openings 108 and 110 in a manner which conforms to the styling and aerodynamic lines of the housing.

Figure 25:
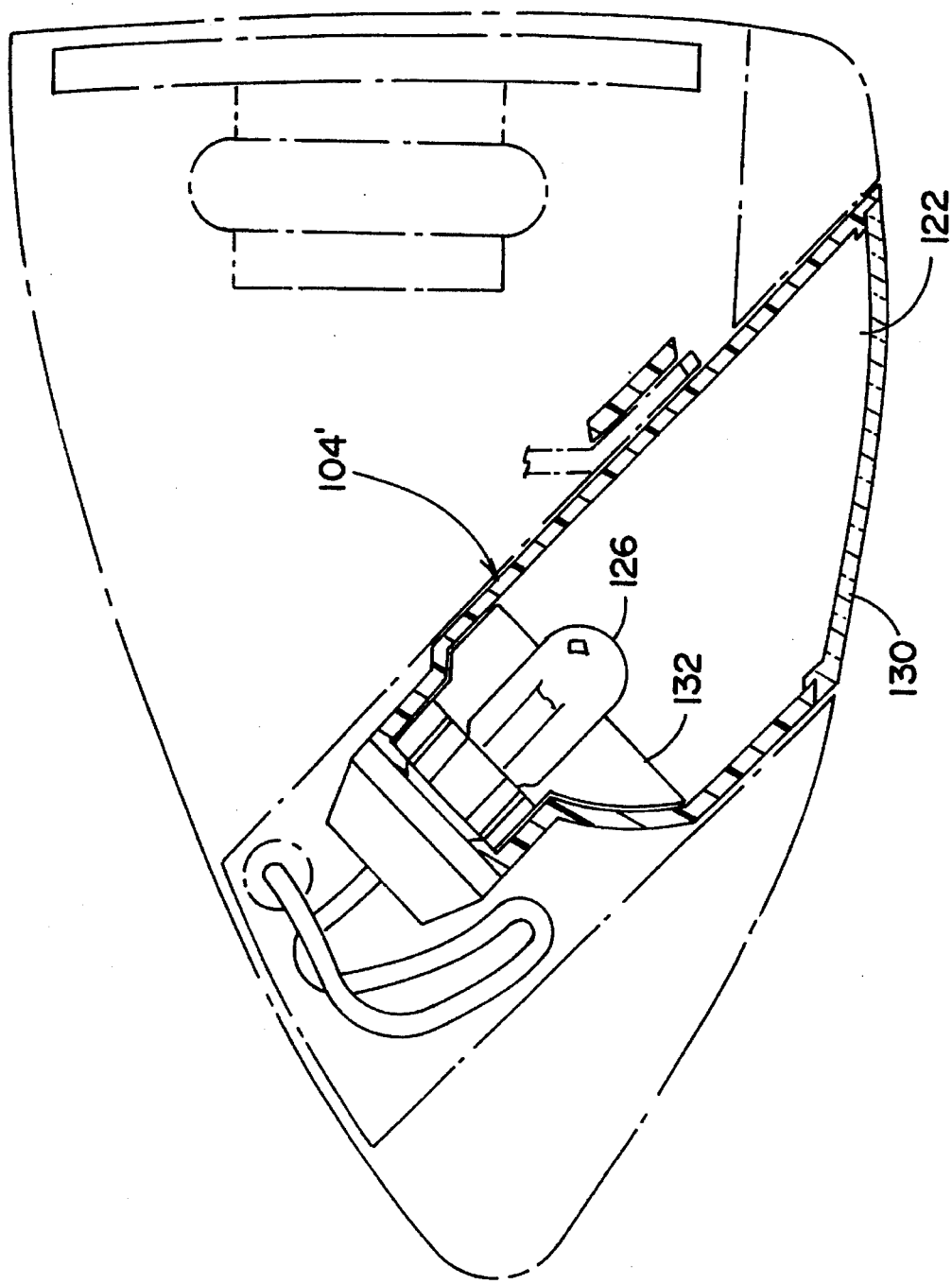
FIG. 25 is the same view as FIG. 23 of an alternative embodiment.

In an alternative embodiment illustrated in FIG. 25, a light module 104' is provided that includes a first downwardly directed light-transmitting opening 122 but does not include a rearwardly directed light-transmitting opening in the housing bezel. Light module 104' provides a puddle of light around the vehicle's doors, but does not include a signal light visible by drivers on the sides of the vehicle 40 equipped with light module 104'. In this manner, a mirror assembly security system, according to the invention, may be provided with a generally downwardly directed security light alone (104') or in combination with a signal light (104), which may illuminate in unison with the vehicle's turn signal, or brake lights, or both. Alternatively, signal light 104 may be provided as a stand-alone module packaged such as described herein and achieving the advantages in terms of modularity, ease of service/installation, weather resilience, etc., described herein. Thus, it is seen that the present invention provides an exceptionally flexible design which is easily adapted to various configurations desired by the vehicle manufacturers. Additionally, because the security system is provided in a unitary module having a unitary cover member/lens, the invention may be readily adapted to many vehicle housing designs without requiring extensive re-engineering of the vehicle exterior mirror housing.

Figure 26:
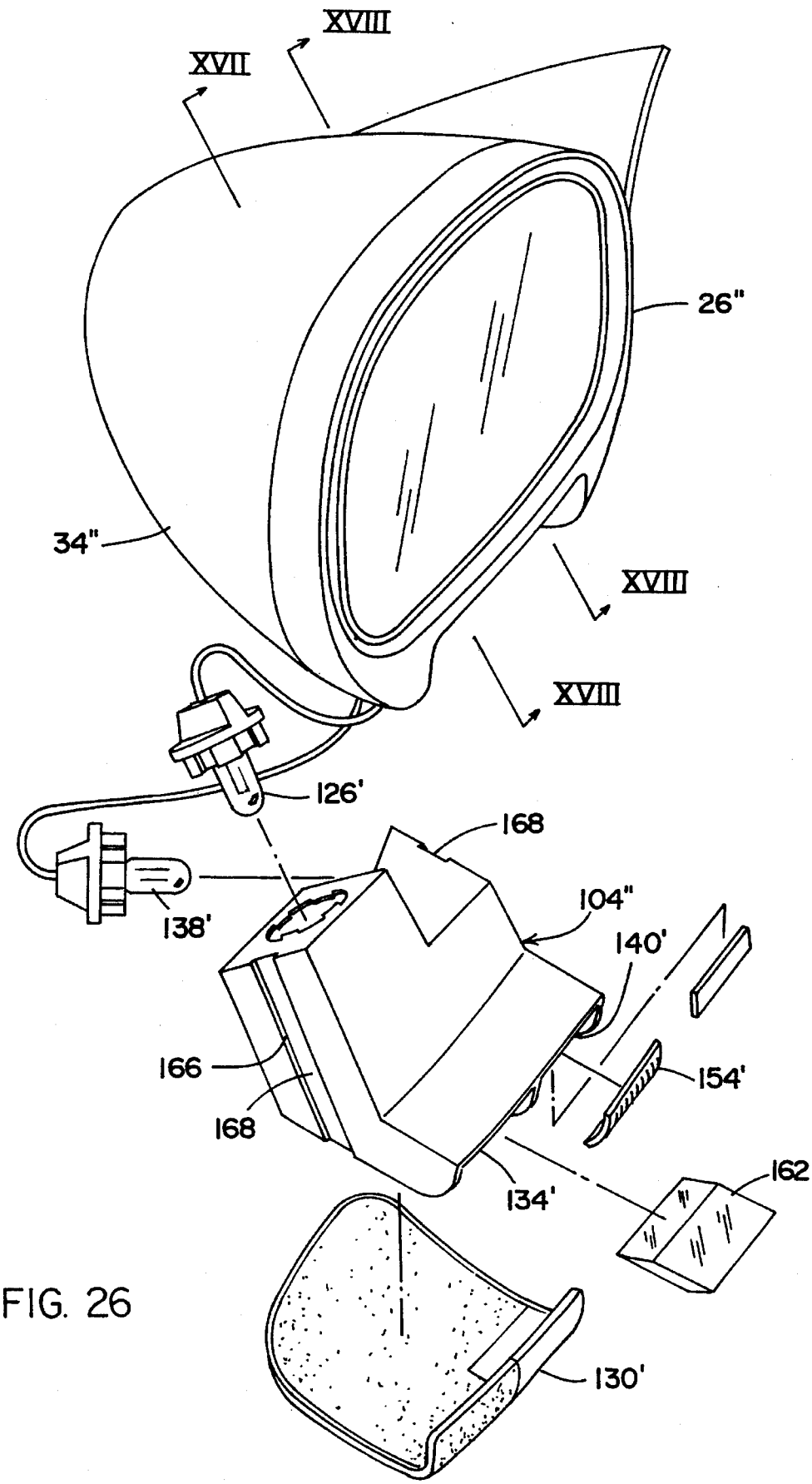
FIG. 26 is an exploded perspective view taken from the front of a mirror assembly of another alternative embodiment of the invention.
Figure 27:
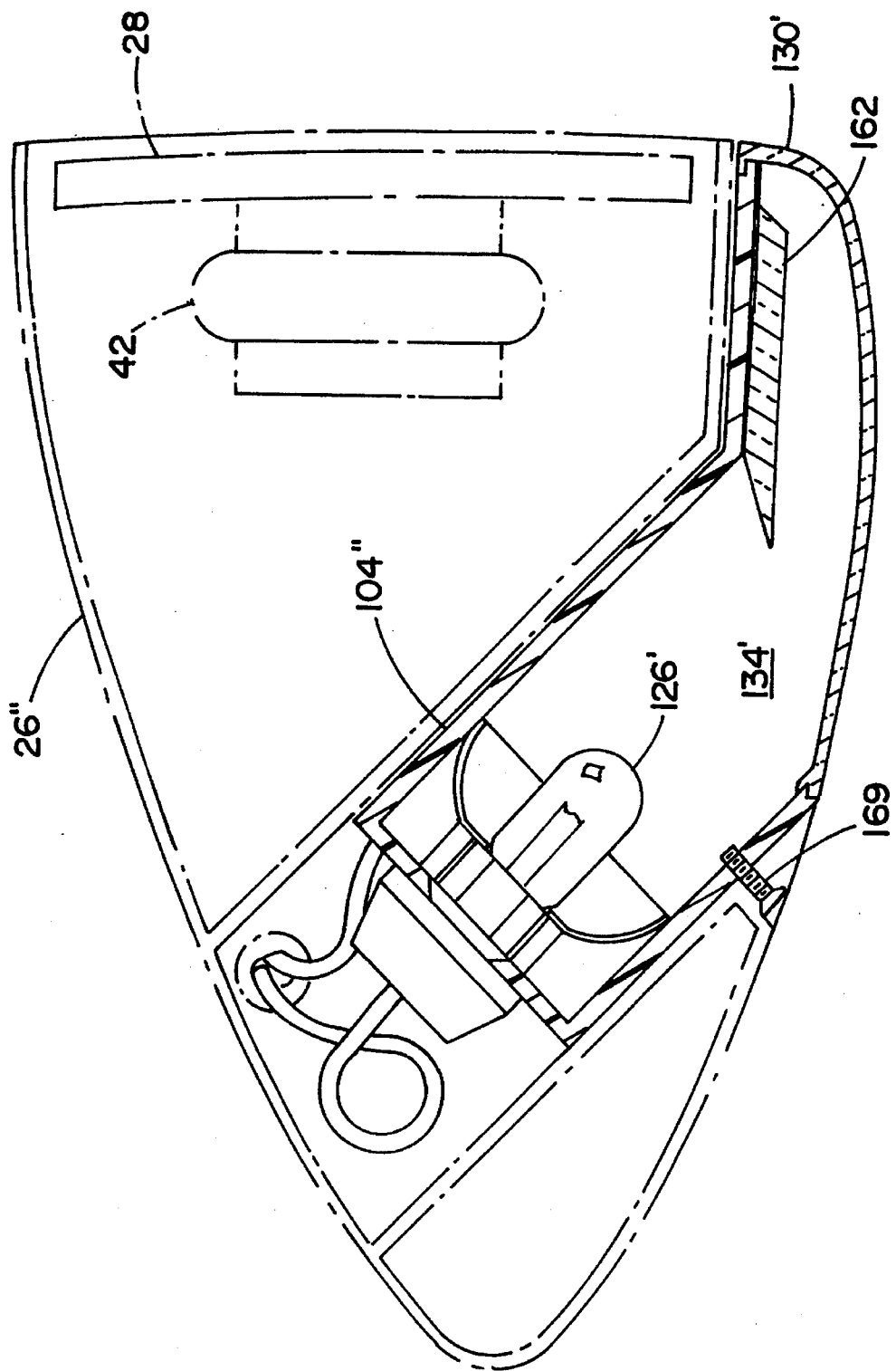
FIG. 27 is a sectional view taken along the lines XXVII—XXVII in FIG. 26.
Figure 28:
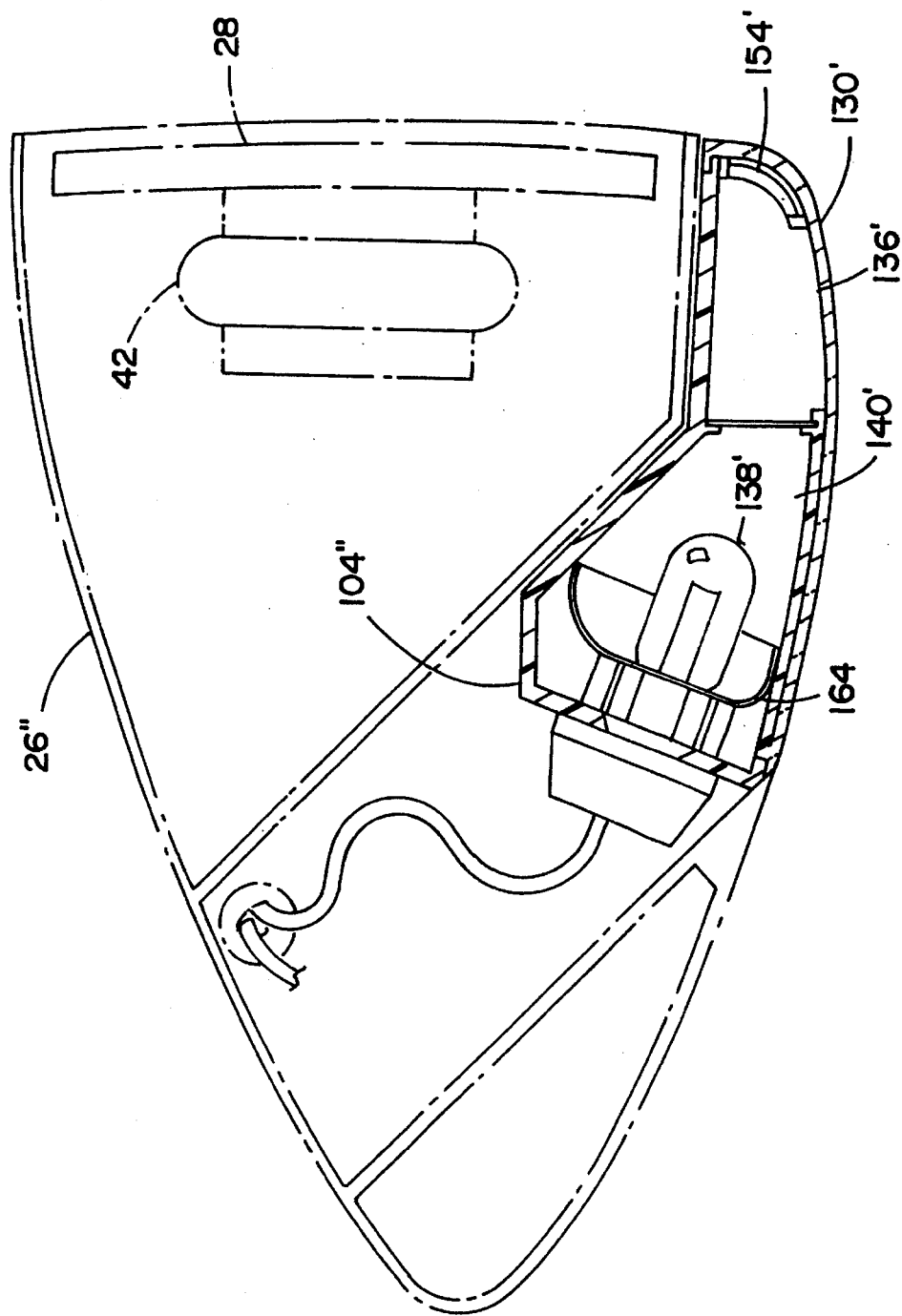
FIG. 28 is a sectional view taken along the lines XXVIII—XXVIII in FIG. 26.

In another embodiment, a light module 104" includes side-by-side cavities 134' and 140' (FIGS. 26–28). Cavity 134' terminates in a light-transmitting opening 122', which extends both downwardly and rearwardly with respect to the vehicle. A light-directing lens, or prism, 162 in cavity 134' captures a portion of the light radiated by light source 126' and directs it rearwardly of the vehicle. The puddle of light produced by light module 104" is capable of extending rearwardly of the vehicle because of the nature of light-transmitting opening 122' and the light redirecting effect of prism 162. The second cavity 140' in enclosure 116' includes a light-transmitting opening 136' which extends generally rearwardly of the vehicle. A light source 138' is positioned within cavity 140' and is surrounded by a reflector 164, which directs light through light-transmitting opening 136'. A diffuser assembly 154' includes an integral cover member and louvers in order to direct light radiated by light source 138' away from the passenger compartment of the vehicle equipped with light module 104". A unitary cover 130' extends over both openings 122' and 136'. Enclosure 116' includes a surface 166, which is configured with a groove 168, which mates with a tongue (not shown) in housing 34" of mirror assembly 36". The mating tongue-and-groove surface configuration is repeated on the surface of enclosure 116', which is opposite surface 166. The tongue-and-groove configuration at least partially retains light module 104" within housing 34" with a fastener, such as a threaded fastener 169, between an opening in housing 34" and extending into enclosure 116'. In the illustrated embodiment, light radiated from light source 126' through light-transmitting opening 122' provides a puddle of light adjacent the vehicle doors in order to produce a lighted security zone. The light radiated through light-transmitting opening 136 produced by light source 138' provides a signal indicator, which may be a turn signal indicator, or a brake signal indicator, or both a turn signal and brake signal indicator.

In another embodiment, a light module 104''' includes a removable fastenerless attachment system 170 including a first member 172 mounted to bracket 43" and a second member 174 mounted to enclosure 116' (FIGS. 29–31). First member 172 is a clip connector having a pair of guide members 176a, 176b and a retaining prong 178 overlaying the guide members. Second member 174 includes a wall 180 defining a doghouse type receiving connector. Guide members 176a, 176b assist the sliding entry of first member 172 into the cavity defined within wall 180 so that prong 178 engages the wall to retain the clip within the cavity.

With fastenerless attachment system 170, module 104''' is easily and readily mounted by a simple insertion into the receiving opening in the mirror housing such that the first member is received by and engaged with the doghouse style receiving connector of the second member. To remove module 104''' for service, a tool, such as a flathead screwdriver, is inserted in the gap between the mirror element and the lamp module and prong 178 is raised, using a lift and twist motion, while the module is being pulled outwards from the mirror housing.

In a preferred embodiment, the lamp module of this invention incorporates a signal light that is a 12-watt #912 incandescent light source available from OSRAM/Sylvania, Hillsboro, N.H. (with about 12-candle power when operated at about 12.8 volts) mounted in a self-gasketing socket available from United Technologies Automotive, Detroit, Mich. under the trade name E25B-13A686-BA and fabricated of an electrical grade polyvinyl chloride injection molding compound such as to comply with Engineering Standard ESB-M4D317-A of Ford Motor Company, Dearborn, Mich., which is hereby incorporated herein by reference or from a thermoplastic rubber self-gasketing socket. The socket, in turn, is housed in a unitary enclosure, as described herein, fabricated of heat resistant polycarbonate supplied by General Electric Plastics, Woodstock, Ill. under the trade name ML4389 and meeting Ford Engineering Specification ESF-M4-D100-A, which is hereby incorporated herein by reference. The lens is made of acrylic supplied by General Electric Plastics under the 141-701 trade name. The LEDs in the signal light, of which six are used, are HLMA-DG00 high power AlInGa solid-state light-emitting diodes supplied by Hewlett Packard Corporation with a dominant wavelength at 622 nanometers, a peak wavelength at 630 nanometers, a 30° viewing angle, and a typical luminous efficiency, at 25° C., of 197 lumens/watt. When incorporated into an exterior mirror housing and mounted on a typical automobile, the ground illumination lamp height is approximately 30±5" from the ground surface, and, when operated at about 12 volts, the lamp light source illuminates an approximately 2-foot by 4-foot or thereabouts ground area adjacent the vehicle with a light level of at least about 10 lux and an average light level of approximately 40 lux.

Light modules of this invention, including a ground illumination lamp and a signal light incorporated into an exterior mirror assembly, were mounted and driven on vehicles through a variety of driving conditions and through varied environmental exposure, and were found to have the performance and environmental resilience required by automakers so as to be suitable for commercial use on vehicles.

Although illustrated herein as being located along the bottom rim of the exterior trim housing, other locations are possible for the signal light of the invention, including the top and outboard rim of the exterior rim housing, and even elsewhere on the exterior vehicle body as appropriate.

Should it be desired to vary the intensity of the signal lights so they are brightest during high ambient lighting conditions, such as on a sunny day, but so that they are dimmer when ambient conditions are lower, such as at night, the intensity of signal light can be modulated using a photosensor such as a photoresistor, photodiode, phototransistor, or their like. A photosensor that controls the intensity of the signal light so that it reduces its intensity during low ambient light driving conditions, such as by pulse width modulation on the electrical line powering the LEDs in the signal light, may be mounted integrally with the lamp module itself, or it may be part of the vehicle electronics itself, such as a photosensor mounted as a part of an automatic electrochromic mirror circuit, as part of a vehicle automatic headlamp activation circuit, as part of a headlamp daylight running light control circuit, or their like.

Also, the concepts of this invention are applicable to a variety of exterior vehicular mirror assembly constructions, including one-part designs, uni-body constructions, and their like, as known in the exterior mirror assembly art. The concepts of the invention are applicable to a variety of assemblies including assemblies that use a bracket as a distinct internal structure and assemblies that do not use a bracket but rather are bracket-less assemblies where the housing itself serves as a structural element with means such as on the walls of the housing for securing an actuator and for receiving a lamp module.

Also, although desirably and preferably finding utility as a security light, the exterior mirror assembly light modules of this invention are also useful for other purposes such as providing for a courtesy exterior light and a general ground illumination light when such fighting may be desired such as when a door is opening, a key is inserted, or a keyboard entry is touched, or when approach of a person to a vehicle is detected such as by voice activation, proximity detection and their like. Also, light modules using the principles and concepts described herein could be provided for mounting on the vehicle other than within an exterior mirror assembly, such as under a door within a door well or under a door body panel so as to provide ground illumination directly under a door whenever said door is opened.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A mirror assembly security system for a vehicle comprising:

a first exterior mirror assembly including a first reflective element and a first housing for said first reflective element;

a first light module removably positioned substantially within said first housing and wherein a portion of said first light module is positioned behind said first reflective element, said first light module projecting light from said first housing on at least a first area adjacent a first portion of the vehicle in order to create a first lighted security zone in said first area; and said first light module including a first enclosure, a first light-transmitting opening in said first enclosure facing downwardly and rearwardly of said vehicle, a first cover for said first light-transmitting opening, and a first light source in said first enclosure radiating light through said first light-transmitting opening and wherein said first light module is substantially moisture impervious.

2. The mirror assembly security system in claim 1 including a first socket positioned in another opening in said first enclosure and including sealing means for sealing said first socket in said another opening, whereby said first light source can be replaced by removing said first light module from said housing and removing said socket from said first light module.

3. The mirror assembly security system in claim 1 including a light-directing surface at least partially surrounding said first light source in said first enclosure.

4. The mirror assembly security system in claim 3 wherein said light-directing surface is configured to direct light generally along a given axis and wherein said axis slopes rearwardly downwardly of the vehicle.

5. The mirror assembly security system in claim 1 wherein said first enclosure slopes from said cover rearwardly and upwardly to a location behind said first reflective element.

6. The mirror assembly security system in claim 1 wherein said first cover is an optical lens.

7. The mirror assembly security system in claim 6 wherein said lens is selected from the group consisting of a diffusive optic, a diffractive optic, a refractive optic, a reflective optic, a holographic optic, a binary optic, a clear optic, and a sinusoidal optic.

8. The mirror assembly security system in claim 7 wherein said lens is a clear optic.

9. The mirror assembly security system in claim 2 wherein said first module comprises a unitary module.

10. The mirror assembly security system in claim 9 including means defining an airflow path through said first enclosure in order to dissipate heat from said first light source.

11. The mirror assembly security system in claim 1 wherein said module is mounted in said first housing in a manner that defines a drain from said housing for water in said first housing.

12. The mirror assembly security system in claim 1 including a second light-transmitting opening in said first enclosure facing at least one of generally downwardly and rearwardly of said vehicle, a second cover for said second light-transmitting opening, and a second light source in said second enclosure radiating light through said second light-transmitting opening.

13. The mirror assembly security system in claim 12 wherein said first light-transmitting opening is facing generally downwardly of said vehicle and said second light-transmitting opening is facing generally rearwardly of said vehicle.

14. The mirror assembly security system in claim 13 wherein said first light source is one of an incandescent lamp, a halogen lamp, at least one light-emitting diode, a vacuum fluorescent lamp, and a light pipe connected between a light source in said vehicle and said first enclosure.

15. The mirror assembly security system in claim 14 wherein said first light source is an incandescent lamp.

16. The mirror assembly security system in claim 13 wherein said second light source is one of an incandescent lamp, a halogen lamp, at least one light-emitting diode, a vacuum fluorescent lamp, and a light pipe connected between a light source in said vehicle and said first enclosure.

17. The mirror assembly security system in claim 16 wherein said second light source is a plurality of light-emitting diodes.

18. The mirror assembly security system in claim 17 including louvers between said light-emitting diodes.

19. The mirror assembly security system in claim 18 wherein said louvers are skewed in a direction away from the vehicle passenger compartment in order to shield the driver from light radiated by said light-emitting diodes.

20. The mirror assembly security system in claim 19 wherein said louvers are skewed at an angle of at least approximately 15° from the longitudinal axis of the vehicle.

21. The mirror assembly security system in claim 20 wherein said louvers are skewed at an angle of between approximately 25° and approximately 30° from the longitudinal axis of the vehicle.

22. The mirror assembly security system in claim 1 including mating surface configurations on said first housing and said first enclosure which at least partially retain said first enclosure in said first housing.

23. The mirror assembly security system in claim 21 wherein said mating surface configuration includes a tongue-and-groove configuration.

24. The mirror assembly security system in claim 21 wherein said mating surface configuration includes at least one pair of deflectable prongs on one of said first housing and said first enclosure that snap-fit within a socket on the other of said first housing and said first enclosure.

25. The mirror assembly security system in claim 21 wherein said mating surface configuration includes at least one guide member on one of said first housing and said first enclosure retained in a doghouse connector on the other of said first housing and said first enclosure by a deflectable clip.

26. The mirror assembly security system in claim 1 wherein said first enclosure is made from a heat-resistant polymer.

27. The mirror assembly security system of claim 26 wherein said polymer has a heat distortion temperature of at least approximately 80° C.

28. The mirror assembly security system in claim 26 wherein said polymer is selected from the group consisting of polycarbonate, polyester, nylon, and ABS.

29. The mirror assembly security system in claim 26 including a light-directing surface at least partially surrounding said light source, said light-directing surface being vacuum-metalized to said first enclosure.

30. The mirror assembly security system of claim 1 wherein said first exterior mirror assembly is a driver-side exterior mirror assembly.

31. The mirror assembly security system of claim 1 wherein said first exterior mirror assembly is a passenger-side exterior mirror assembly.

32. The mirror assembly security system of claim 30 further including a second exterior mirror assembly having a second reflective element and a second housing for said second reflective element, and a second light module removably positioned in said second housing, said second light module projecting light from said second housing on at least a second area adjacent a second portion of the vehicle in order to create a second lighted security zone in said second area, said second exterior mirror assembly being a passenger-side exterior mirror assembly, and said second light module including a second enclosure, a second light-transmitting opening in said second enclosure facing at least one of generally downwardly and rearwardly of said vehicle, a second cover for said second light-transmitting opening, and a second light source in said second enclosure radiating light through said second light-transmitting opening.

33. The mirror assembly security system of claim 32 including a second socket positioned in another opening in said second enclosure and including second means for sealing said second socket in said another opening in said second enclosure, whereby said second light source can be replaced by removing said second light module from said second housing and removing said second socket from said second light module.

34. The mirror assembly security system of claim 32 wherein at least one of said first light source and said second light source selected from the group consisting of an incandescent lamp, a halogen lamp, a light-emitting diode, a vacuum fluorescent lamp, and a light pipe connecting between a light source in the vehicle and at least one of said first housing and said second housing.

35. The mirror assembly security system of claim 33 wherein said first cover is a non-filtering lens and said second cover is a non-filtering lens.

36. The mirror assembly security system of claim 35 wherein each of said first pattern of light and said second pattern of light is substantially white light.

37. The mirror assembly security system of claim 32 wherein at least one of said first reflective element and said second reflective element is an electro-optic mirror.

38. The mirror assembly security system of claim 37 wherein said electro-optic mirror is an electrochromic mirror.

39. The mirror assembly security system of claim 38 wherein said electrochromic mirror is an electrochemichromic mirror.

40. The mirror assembly security system of claim 1 wherein said first reflective element is an electro-optic mirror.

41. The mirror assembly security system of claim 40 wherein said electro-optic mirror is an electrochromic mirror.

42. The mirror assembly security system of claim 41 wherein said electrochromic mirror is an electrochemichromic mirror.

43. A mirror assembly security system for a vehicle comprising:

an exterior mirror assembly including a reflective element, a housing for said reflective element and a positioning device for adjustably positioning said reflective element in said first housing;

a light module removably positioned substantially within said housing and wherein a portion of said light module is positioned behind said reflective element, said module projecting light from said housing on at least an area adjacent a portion of the vehicle in order to create a lighted security zone in said area; and said light module including an enclosure having wail means defining a first enclosure cavity, a first light-transmitting opening in said first cavity facing at least one of generally downwardly and rearwardly of said vehicle, a first cover for said first light-transmitting opening, and a first light source in said first cavity radiating light generally along a first axis through said first light-transmitting opening, said enclosure positioned in an opening in a surface of said housing facing at least one of generally downwardly and rearwardly of said vehicle and said enclosure sloping generally upwardly from said first light-transmitting opening to a location behind said positioning device.

44. The mirror assembly security system in claim 43 wherein said first light-radiating axis slopes upwardly forwardly with respect to said vehicle.

45. The mirror assembly security system in claim 43 including another opening in said first cavity, a first socket positioned in said another opening and including a first gasket for sealing said first socket in said another opening, whereby said first light source can be replaced by removing said first light module from said housing and removing said socket from said light module.

46. The mirror assembly security system in claim 43 including a light-directing surface at least partially surrounding said first light source in said first cavity for directing light along said first axis.

47. The mirror assembly security system in claim 43 wherein said first cover is an optical lens.

48. The mirror assembly security system in claim 47 wherein said lens is selected from the group consisting of a diffusive optic, a diffractive optic, a refractive optic, a reflective optic, a holographic optic, a binary optic, a clear optic, and a sinusoidal optic.

49. The mirror assembly security system in claim 48 wherein said lens is a clear optic.

50. The mirror assembly security system in claim 43 wherein said light module is substantially moisture impervious.

51. The mirror assembly security system in claim 43 including a second enclosure cavity, a second light-transmitting opening in said second cavity facing at least one of generally downwardly and rearwardly of said vehicle, a second cover for said second light-transmitting opening, and a second light source in said second cavity radiating light generally along a second axis through said second light-transmitting opening.

52. The mirror assembly security system in claim 51 wherein said first light-transmitting opening is facing generally downwardly of said vehicle and said second light-transmitting opening is facing generally rearwardly of said vehicle.

53. The mirror assembly security system in claim 52 wherein said first light source is one of an incandescent lamp, a halogen lamp, at least one light-emitting diode, a vacuum fluorescent lamp, and a light pipe connected between a light source in said vehicle and said first enclosure.

54. The mirror assembly security system in claim 53 wherein said first light source is an incandescent lamp.

55. The mirror assembly security system in claim 52 wherein said second light source is one of an incandescent lamp, a halogen lamp, at least one light-emitting diode, a vacuum fluorescent lamp, and a light pipe connected between a light source in said vehicle and said first enclosure.

56. The mirror assembly security system in claim 55 wherein said second light source is a plurality of light-emitting diodes.

57. The mirror assembly security system in claim 56 wherein said second light-radiating axis extends rearwardly away from the vehicle passenger compartment.

58. The mirror assembly security system in claim 57 wherein said second light-radiating axis is at an angle of at least approximately 15° from the longitudinal axis of the vehicle.

59. The mirror assembly security system in claim 58 wherein said second light-radiating axis is at an angle of between approximately 25° and approximately 30° from the longitudinal axis of the vehicle.

60. The mirror assembly security system in claim 56 including louvers between said light-emitting diodes.

61. The mirror assembly security system in claim 60 wherein said louvers are skewed in a direction away from the vehicle passenger compartment in order to shield the driver from light radiated by said light-emitting diodes.

62. The mirror assembly security system in claim 43 including mating surface configurations on said housing and said enclosure which at least partially retain said enclosure in said housing.

63. The mirror assembly security system in claim 62 wherein said mating surface configuration includes a tongue-and-groove configuration.

64. The mirror assembly security system in claim 62 wherein said mating surface configuration includes at least one pair of deflectable prongs on one of said housing and said enclosure that snap-fit within a socket in the other of said housing and said enclosure.

65. The mirror assembly security system in claim 62 wherein said mating surface configuration includes at least one guide member on one of said housing and said enclosure retained in a doghouse connector on the other of said housing and said enclosure by a deflectable clip.

66. The mirror assembly security system in claim 43 wherein said enclosure is made from a heat-resistant polymer.

67. The mirror assembly security system in claim 66 wherein said polymer has a heat distortion temperature of at least approximately 80° C.

68. The mirror assembly security system in claim 66 wherein said polymer is selected from the group consisting of polycarbonate, polyester, nylon, and ABS.

69. The mirror assembly security system in claim 66 including a light-directing surface at least partially surrounding said first light source, said light-directing surface being vacuum-metalized to wall means defining said light-generating cavity.

70. The mirror assembly security system of claim 43 wherein said exterior mirror assembly is a driver-side exterior mirror assembly.

19

71. The mirror assembly security system of claim 43 wherein said exterior mirror assembly is a passenger-side exterior mirror assembly.

72. The mirror assembly security system of claim 43 wherein said reflective element is an electro-optic mirror.

73. The mirror assembly security system of claim 72 wherein said electro-optic mirror is an electrochromic mirror.

74. The mirror assembly security system of claim 73 wherein said electrochromic mirror is an electrochemichromic mirror.

75. A light module adapted to be removably positioned in an opening in a vehicle exterior mirror assembly having a reflective element, housing for said reflective element and a retaining structure located within said housing, comprising:
   an enclosure having wall means defining a first enclosure cavity;
   a first light-transmitting opening in said first enclosure cavity;
   a first cover for said first light-transmitting opening;
   a first light source in said first enclosure cavity radiating light through said first light-transmitting opening; and
   a retaining structure on an exterior surface of said enclosure configured to mate with the retaining structure within the exterior mirror housing in order to at least partially retain said enclosure substantially within the exterior mirror housing; wherein a portion of said enclosure is behind said reflective element, and wherein said enclosure can be slidably received through said opening in said housing and releasably retained by said retaining structures.

76. The light module in claim 75 wherein said retaining structures include a tongue-and-groove configuration.

77. The light module in claim 75 wherein said retaining structures include at least one pair of deflectable prongs and a socket wherein said prongs snap fit within said socket.

78. The light module in claim 75 wherein said retaining structures include at least one guide member retained in a doghouse connector by a deflectable clip.

79. The light module in claim 75 wherein said enclosure is made from a heat-resistant polymer.

80. The light module in claim 79 wherein said polymer has a heat distortion temperature of at least approximately 80° C.

81. The light module in claim 79 including a light-directing surface at least partially surrounding said first light source, said light-directing surface being vacuum-metalized to wall means defining said enclosure cavity.

82. The light module in claim 79 including a light-directing surface at least partially surrounding said first light source, said light-directing surface being vacuum-metalized to wall means defining said enclosure cavity.

83. The light module in claim 75 including a first socket positioned in another opening in said first cavity and including a first gasket for sealing said first socket in said another opening, whereby said first light source can be replaced by removing said first light module from said housing and removing said socket from said light module.

84. The light module in claim 75 including a light-directing surface at least partially surrounding said first light source.

85. The light module in claim 75 wherein said first cover is an optical lens.

86. The light module in claim 85 wherein said lens is selected from the group consisting of a diffusive optic, a diffractive optic, a refractive optic, a reflective optic, a holographic optic, a binary optic, a clear optic, and a sinusoidal optic.

87. The light module in claim 86 wherein said lens is a clear optic.

88. The light module in claim 75 including a second enclosure cavity, a second light-transmitting opening in said second enclosure cavity, a second cover for said second light-transmitting opening, and a second light source in said second enclosure cavity radiating light through said second light-transmitting opening.

89. The light module in claim 88 wherein said first light source is one of an incandescent lamp, a halogen lamp, at least one light-emitting diode, a vacuum fluorescent lamp, and a light pipe connected between a light source in said vehicle and said first enclosure.

90. The light module in claim 89 wherein said first light source is an incandescent lamp.

91. The light module in claim 88 wherein said second light source is one of an incandescent lamp, a halogen lamp, at least one light-emitting diode, a vacuum fluorescent lamp, and a light pipe connected between a light source in said vehicle and said first enclosure.

92. The light module in claim 91 wherein said second light source is a plurality of light-emitting diodes.

93. The light module in claim 92 including louvers between said light-emitting diodes.

94. A mirror assembly security system for a vehicle comprising:
   an exterior mirror assembly attached to the vehicle including a reflective element, a housing for said reflective element, and a positioning device mounted to said reflective dement for adjustably positioning said reflective element in said housing;
   a light module removably positioned substantially within said housing and wherein a portion of said light module is positioned behind said reflective element, said light module projecting light from said housing on at least an area adjacent a portion of the vehicle in order to create a lighted security zone in said area;
   said light module including an enclosure having wall means defining an enclosure cavity, a light-transmitting opening in said cavity, a cover for said light-transmitting opening and a light source in said cavity radiating light through said light-transmitting opening; and
   mating retaining elements for at lest partially removably retaining said light module in said housing, said mating retaining elements including mating surface configurations on said enclosure and said housing.

95. The mirror assembly security system in claim 94 wherein said mating retaining elements include at least one pair of prongs and a socket wherein said prongs releasably engage said socket.

96. The mirror assembly security system in claim 94 wherein said mating retaining elements include at least one guide member retained in a doghouse connector by a deflectable clip.

97. The mirror assembly security system of claim 2 wherein said sealing means comprises a polymer material having a durometer hardness in the range of from about 50 to about 95 SHORE A.

98. The mirror assembly system of claim 2 wherein said socket is at least partially formed of a resilient polymer material so as to be self-gasketing at its mating surface to said first enclosure.

99. The mirror assembly system of claim 83 wherein said first gasket comprises a polymer material having a durometer hardness in the range of about 50 to about 95 SHORE A.

100. The mirror assembly system of claim 99 wherein said first socket is at least partially formed of a resilient polymer material so as to be self-gasketing at its mating surface to said enclosure.

101. A light module adapted to be removably positioned in an opening in a vehicle exterior mirror assembly having a housing comprising:

an enclosure having walls defining an enclosure cavity;

a light-transmitting opening in said enclosure cavity;

said opening being covered with a lens;

a light source in said enclosure cavity radiating light through said opening; and a first socket positioned in another opening in said enclosure and including a sealing means comprising a polymer material having a durometer hardness in the range of from about 50 to about 95 SHORE A for sealing said first socket in said opening, whereby said light source can be replaced by removing said light module from said housing and removing said first socket from said light module.

102. The light module of claim 101 wherein said first socket is at least partially formed of a resilient polymer material so as to be self-gasketing at is mating surface to said enclosure.

103. The light module of claim 101 wherein said module is substantially moisture impervious.

104. A signal light module adapted to be removably positioned in an opening in a vehicle exterior mirror assembly comprising:

an enclosure having walls defining an enclosure cavity;

a light-transmitting opening in said enclosure cavity;

said opening being covered with a lens; and a plurality of light-emitting diodes with louvers therebetween in said enclosure cavity;

wherein said light-emitting diodes radiate light generally along a light-radiating axis that extends rearwardly away from the passenger compartment of a vehicle in order to shield the driver from light radiated by said light-emitting diodes, said light-radiating axis being at an angle of at least approximately 15° from the longitudinal axis of the vehicle.

105. The signal light module of claim 104 wherein said light-radiating axis is at an angle of between approximately 25° and approximately 30° from the longitudinal axis of the vehicle.

106. The signal light module of claim 104 wherein said light-emitting diodes are solid-state light-emitting diodes.

* * * * *

UNITED STATES PATENT AND TRADEMARK OFFICE
CERTIFICATE OF CORRECTION

PATENT NO. : 5,497,306
DATED : March 5, 1996
INVENTOR(S) : Todd W. Pastrick

It is certified that error appears in the above-indentified patent and that said Letters Patent is hereby corrected as shown below:

Column 5, line 34:
"Industile" should be --Industrie--.

Column 5, line 50:
"dement" should be --element--.

Column 6, line 52:
"carded" should be --carried--.

Column 13, line 64:
"fighting" should be --lighting--.

Column 17, claim 43, line 16:
"wail" should be --wall--.

Column 19, claim 75, line 13:
"in-an" should be --in an--.

Column 20, claim 94, line 33:
"dement" should be --element--.

UNITED STATES PATENT AND TRADEMARK OFFICE
CERTIFICATE OF CORRECTION

PATENT NO. : 5,497,306
DATED : March 5, 1996
INVENTOR(S) : Todd W. Pastrick

It is certified that error appears in the above-indentified patent and that said Letters Patent is hereby corrected as shown below:

Column 20, claim 94, line 46:
 "lest" should be --least--.

Signed and Sealed this

Twenty-fourth Day of June, 1997

Attest:

BRUCE LEHMAN

Attesting Officer

Commissioner of Patents and Trademarks

(12) EX PARTE REEXAMINATION CERTIFICATE (6002nd)
United States Patent
Pastrick

(10) Number: US 5,497,306 C1
(45) Certificate Issued: Nov. 13, 2007

(54) EXTERIOR VEHICLE SECURITY LIGHT

(75) Inventor: Todd W. Pastrick, Spring Lake, MI (US)

(73) Assignee: Donnelly Corporation, Holland, MI (US)

Reexamination Request:
No. 90/006,907, Jan. 14, 2004

Reexamination Certificate for:
Patent No.: 5,497,306
Issued: Mar. 5, 1996
Appl. No.: 08/426,591
Filed: Apr. 21, 1995

Certificate of Correction issued Jun. 24, 1997.

Related U.S. Application Data

(63) Continuation-in-part of application No. 08/333,412, filed on Nov. 2, 1994, now Pat. No. 5,497,305, which is a continuation of application No. 08/011,947, filed on Feb. 1, 1993, now Pat. No. 5,371,659.

(51) Int. Cl.
*B60Q 1/26* (2006.01)

(52) U.S. Cl. .................. 362/494; 362/545; 362/547
(58) Field of Classification Search ............. 362/494, 362/545, 547, 140, 141, 142
See application file for complete search history.

(56) References Cited

U.S. PATENT DOCUMENTS

| | | | | |
|---|---|---|---|---|
| 2,414,223 A | * | 1/1947 | De Virgilis | 362/141 |
| 4,136,925 A | * | 1/1979 | Menzies et al. | 359/508 |
| 4,143,368 A | | 3/1979 | Route et al. | |
| 4,223,983 A | * | 9/1980 | Bloom | 359/864 |
| 4,281,899 A | | 8/1981 | Oskam | 350/289 |
| 4,569,002 A | | 2/1986 | English et al. | |
| 4,583,155 A | * | 4/1986 | Hart | 362/285 |
| 4,646,207 A | | 2/1987 | Levin et al. | |
| 4,661,800 A | * | 4/1987 | Yamazaki | 362/494 |
| 4,693,571 A | | 9/1987 | Kimura et al. | 350/634 |
| 4,733,336 A | | 3/1988 | Skogler et al. | |
| 4,772,989 A | | 9/1988 | Haraden | 362/80 |
| 4,809,137 A | * | 2/1989 | Yamada | 362/494 |
| 4,868,722 A | | 9/1989 | Haraden | 362/80 |
| 4,890,907 A | * | 1/1990 | Vu et al. | 359/843 |
| 4,916,430 A | * | 4/1990 | Vu et al. | 340/463 |
| 5,017,903 A | * | 5/1991 | Krippelz, Sr. | 340/472 |
| 5,059,015 A | | 10/1991 | Tran | 359/844 |
| 5,151,824 A | | 9/1992 | O'Farrell | |
| 5,166,240 A | * | 11/1992 | Sakazume et al. | 524/451 |
| 5,178,448 A | * | 1/1993 | Adams et al. | 362/494 |
| 5,287,101 A | | 2/1994 | Serizawa | 340/815.76 |
| 5,448,397 A | * | 9/1995 | Tonar | 359/272 |

FOREIGN PATENT DOCUMENTS

| | | |
|---|---|---|
| DE | 26 34 372 A1 | 2/1978 |
| DE | 3614882 A1 | 11/1987 |
| DE | 36 35 471 A1 | 4/1988 |
| EP | 0525541 B1 | 11/1994 |

(Continued)

OTHER PUBLICATIONS

San Diego Plastics, Inc., Kydex Sheet Products, KyDEX 6185; http://web.archive.org/web/20030221091109.http://www.sdplastics.com/kydex6185.html.*

*Primary Examiner*—Ovidio Escalante

(57) ABSTRACT

A mirror assembly security system for a vehicle includes an exterior mirror assembly and a light module removably positioned within the exterior mirror housing. The light module is moisture impervious and includes an enclosure, a light-transmitting opening in the enclosure facing generally downwardly and/or rearwardly of the vehicle, a cover for the light-transmitting opening, and a light source in the enclosure radiating light through the light-transmitting opening. The light source may be received in a socket which removably engages another opening in the enclosure. In this manner, the light source may be replaced by removing the module from the exterior mirror housing, removing the socket from the enclosure and replacing the light source. The enclosure and mirror housing preferably are configured to self-retain the module in the exterior mirror moving with no, or fewer than one or two, separate fasteners.

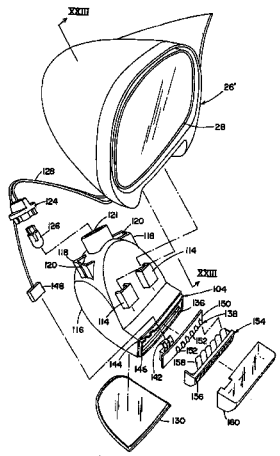

FOREIGN PATENT DOCUMENTS

| | | | |
|---|---|---|---|
| GB | 1555541 A | * | 11/1979 |
| GB | 1555541 | * | 11/1979 |
| JP | 58188733 | | 11/1983 |
| JP | SHO 60161646 | * | 4/1984 |
| JP | 61188242 A | * | 8/1986 |
| JP | 62-191246 | | 8/1987 |

* cited by examiner

US 5,497,306 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 75–96, 99–106 is confirmed.

Claims 1, 2, 12, 22–25, 29, 33, 43, 45, 51, 62 and 69 are determined to be patentable as amended.

Claims 3–11, 13–21, 26–28, 30–32, 34–42, 44, 46–50, 52–61, 63–68, 70–74, 97 and 98, dependent on an amended claim, are determined to be patentable.

New claims 107–152 are added and determined to be patentable.

1. A mirror assembly security system for a vehicle comprising:
    a first exterior mirror assembly including a first reflective element and a first housing for said first reflective element;
    *said first reflective element adjustable within said first housing;*
    a first *unitary* light module [removably] positioned substantially within said first housing *and removable therefrom as a sealed unitary module* and wherein a portion of said first *unitary* light module is positioned behind said first reflective element, said first *unitary* light module projecting light from said first housing on at least a first area adjacent a first portion of the vehicle in order to create a first lighted security zone in said first area, *wherein said first lighted security zone includes at least a ground area adjacent a front door of the vehicle*; and
    said first *unitary* light module including a first enclosure, a first light-transmitting opening in said first enclosure facing downwardly and rearwardly of said vehicle, [a first cover for said first light-transmitting opening, and a first light source in said first enclosure radiating light through said first light-transmitting opening] *a first light source in said first enclosure radiating light through said first light-transmitting opening, said first light source being remotely actuated by a vehicle owner approaching the vehicle from a distance, said first light-transmitting opening sealed closed by a first cover whereby light emitted by said first light source passes through said first cover, wherein said first cover is permanently joined to said first enclosure at said first light-transmitting opening of said first enclosure* and wherein said first *unitary* light module is substantially moisture impervious *and wherein said first unitary light module is adapted so as to be removable as a unit for service*.

2. [The mirror assembly security system in claim 1 including] *A mirror assembly security system for a vehicle comprising:*
    *a first exterior mirror assembly including a first reflective element and a first housing for said first reflective element;*
    *a first light module removably positioned substantially within said first housing and wherein a portion of said first light module is positioned behind said first reflective element, said first light module projecting light from said first housing on at least a first area adjacent a first portion of the vehicle in order to create a first lighted security zone in said first area;*
    *said first light module including a first enclosure, a first light-transmitting opening in said first enclosure facing downwardly and rearwardly of said vehicle, a first light source in said first enclosure radiating light through said first light-transmitting opening, said first light-transmitting opening closed by a first cover whereby light emitted by said first light source passes through said first cover, and wherein said first light module is substantially moisture impervious; and*
    a first socket positioned in another opening in said first enclosure and including sealing means for sealing said first socket in said another opening, whereby said first light source can be replaced by removing said first light module from said housing and removing said socket from said first light module.

12. [The mirror assembly security system in claim 1 including] *A mirror assembly security system for a vehicle comprising:*
    *a first exterior mirror assembly including a first reflective element and a first housing for said first reflective element;*
    *a first module removably positioned substantially within said first housing and wherein a portion of said first light module is positioned behind said first reflective element, said first light module projecting light from said first housing on at least a first area adjacent a first portion of the vehicle in order to create a first lighted security zone in said first area;*
    *said first light module including a first enclosure, a first light-transmitting opening in said first enclosure facing downwardly and rearwardly of said vehicle, a first light source in said first enclosure radiating light through said first light-transmitting opening, said first light-transmitting opening closed by a first cover whereby light emitted by said first light source passes through said first cover, and wherein said first light module is substantially moisture impervious; and*
    a second light-transmitting opening in said first enclosure facing at least one of generally downwardly and rearwardly of said vehicle, a second cover for said second light-transmitting opening, and a second light source in said second enclosure radiating light through said second light-transmitting opening.

22. [The mirror assembly security system in claim 1] *A mirror assembly security system for a vehicle comprising:*
    *a first exterior mirror assembly including a first reflective element and a first housing for said first reflective element;*
    *a first light module removably positioned substantially within said first housing and wherein a portion of said first light module is positioned behind said first reflective element, said first light module projecting light from said first housing on at least a first area adjacent a first portion of the vehicle in order to create a first lighted security zone in said first area; and*
    *said first light module including a first enclosure, a first light-transmitting opening in said first enclosure facing* downwardly and rearwardly of said vehicle, a first cover for said first light-transmitting opening, and a first light source in said first enclosure radiating light through said first light-transmitting opening and wherein said first light module is substantially moisture impervious including mating surface configurations on said first housing and said first enclosure which at least partially retain said first enclosure in said first housing.

23. The mirror assembly security system in claim [21] *22* wherein said mating surface configuration includes a tongue-and-groove configuration.

24. The mirror assembly security system in claim [21] *22* wherein said mating surface configuration includes at least one pair of deflectable prongs on one of said first housing and said first enclosure that snap-fit within a socket on the other of said first housing and said first enclosure.

25. The mirror assembly security system in claim [21] *22* wherein said mating surface configuration includes at least one guide member on one of said first housing and said first enclosure retained in a doghouse connector on the other of said first housing and said first enclosure by a deflectable clip.

29. [The mirror assembly security system in claim 26 including] *A mirror assembly security system for a vehicle comprising:*
- *a first exterior mirror assembly including a first reflective element and a first housing for said first reflective element;*
- *a first light module removably positioned substantially within said first housing and wherein a portion of said first light module is positioned behind said first reflective element, said first light module projecting light from said first housing on at least a first area adjacent a first portion of the vehicle in order to create a first lighted security zone in said first area;*
- *said first light module including a first enclosure, a first light-transmitting opening in said first enclosure facing downwardly and rearwardly of said vehicle, a first light source in said first enclosure radiating light through said first light-transmitting opening, said first light-transmitting opening closed by a first cover whereby light emitted by said first light source passes through said first cover, and wherein said first light module is substantially moisture impervious;*
- *wherein said first enclosure is made from a heat-resistant polymer; and*
- a light-directing surface at least partially surrounding said light source, said light-directing surface being vacuum-metalized to said first enclosure.

33. [The mirror assembly security system in claim 32 including] *A mirror assembly security system for a vehicle comprising*;
- *a first exterior mirror assembly including a first reflective element and a first housing for said first reflective element;*
- *a first light module removably positioned substantially within said first housing and wherein a portion of said first light module is positioned behind said first reflective element, said first light module projecting light from said first housing on at least a first area adjacent a first portion of the vehicle in order to create a first lighted security zone in said first area;*
- *said first light module including a first enclosure, a first light-transmitting opening in said first enclosure facing downwardly and rearwardly of said vehicle, a first light source in said first enclosure radiating light through said first light-transmitting opening, said first light-transmitting opening closed by a first cover whereby light emitted by said first light source passes through said first cover, and wherein said first light module is substantially moisture impervious;*
- *wherein said first exterior mirror assembly is a driver-side exterior assembly;*
- *a second exterior mirror assembly having a second reflective element and a second housing for said second reflective element, and a second light module removably positioned in said second housing, said second light module projecting light from said second housing on at least a second area adjacent a second portion of the vehicle in order to create a second lighted security zone in said second area, said second exterior mirror assembly being a passenger-side exterior mirror assembly, and said second light module including a second enclosure, a second light-transmitting opening in said second enclosure facing at least one of generally downwardly and rearwardly of said vehicle, a second cover for said second light-transmitting opening, and a second light source in said second radiating light through said second light-transmitting opening; and*
- *a second socket positioned in another opening in said second enclosure and including second means for sealing said second socket in said another opening in said second enclosure, whereby said second light source can be replaced by removing said second light module from said second housing and removing said second socket from said second light module.*

43. *A mirror assembly security system for a vehicle comprising:*
- *an exterior mirror assembly including a reflective element, a housing for said reflective element and a positioning device for adjustably positioning said reflective element in said first housing;*
- *a unitary light module [removably] positioned substantially within said housing and removable therefrom as a sealed unitary module and wherein a portion of said unitary light module is positioned behind said reflective element, said unitary light module projecting light from said housing on at least an area adjacent a portion of the vehicle in order to create a lighted security zone in said area, wherein said lighted security zone includes at least a ground area adjacent a front door of the vehicle; and*
- said *unitary* light module including an enclosure having wall means defining a first enclosure cavity, a first light-transmitting opening in said first cavity facing at least one of generally downwardly and rearwardly of said vehicle, [a first cover for] said first light-transmitting opening *sealed closed by a first cover, wherein said first cover is permanently joined to said enclosure at said first light-transmitting opening of said enclosure* and a first light source in said first cavity radiating light generally along a first axis through said first [light-transmitting opening] *cover, said first light source being remotely actuated by a vehicle owner approaching the vehicle from a distance*, said enclosure positioned in an opening in a surface of said housing facing at least one of generally downwardly and rearwardly of said vehicle and said enclosure sloping generally upwardly from said first light-transmitting opening to a location behind said positioning device *and wherein said unitary light module is adapted so as to be removable as a unit for service.*

45. [The mirror assembly security system in claim 43 including] *A mirror assembly security system for a vehicle comprising:*

*an exterior mirror assembly including a reflective element, a housing for said reflective element and a positioning device for adjustably positioning said reflective element in said first housing;*

*a light module removably positioned substantially within said housing and wherein a portion of said light module is positioned behind said reflective element, said module projecting light from said housing on at least an area adjacent a portion of the vehicle in order to create a lighted security zone in said area; and*

*said light module including an enclosure having wall means defining a first enclosure cavity, a first light-transmitting opening in said first cavity facing at least one of generally downwardly and rearwardly of said vehicle, said first light-transmitting opening closed by a first cover, and a first light source in said first cavity radiating light generally along a first axis through said first cover, said enclosure positioned in an opening in a surface of said housing facing at least one of generally downwardly and rearwardly of said vehicle and said enclosure sloping generally upwardly from said first light-transmitting opening to a location behind said positioning device; and* another opening in said first cavity, a first socket positioned in said another opening and including a first gasket for sealing said first socket in said another opening, whereby said first light source can be replaced by removing said first light module from said housing and removing said socket from said light module.

51. [The mirror assembly security system in claim 43 including] *A mirror assembly security system for a vehicle comprising:*

*an exterior mirror assembly including a reflective element, a housing for said reflective element and a positioning device for adjustably positioning said reflective element in said first housing;*

*a light module removably positioned substantially within said housing and wherein a portion of said light module is positioned behind said reflective element, said module projecting light from said housing on at least an area adjacent a portion of the vehicle in order to create a lighted security zone in said area;*

*said light module including an enclosure having wall means defining a first enclosure cavity, a first light-transmitting opening in said first cavity facing at least one of generally downwardly and rearwardly of said vehicle, said first light-transmitting opening closed by a first cover, and a first light source in said first cavity radiating light generally along a first axis through said first cover, said enclosure positioned in an opening in a surface of said housing facing at least one of generally downwardly and rearwardly of said vehicle and said enclosure sloping generally upwardly from said first light-transmitting opening to a location behind said positioning device; and* a second enclosure cavity, a second light-transmitting opening in said second cavity facing at least one of generally downwardly and rearwardly of said vehicle, a second cover for said second light-transmitting opening, and a second light source in said second cavity radiating light generally along a second axis through said second light-transmitting opening.

62. [The mirror assembly security system in claim 43] *A mirror assembly security system for a vehicle comprising:*

*an exterior mirror assembly including a reflective element, a housing for said reflective element and a positioning device for adjustably positioning said reflective element in said first housing;*

*a light module removably positioned substantially within said housing and wherein a portion of said light module is positioned behind said reflective element, said module projecting light from said housing on at least an area adjacent a portion of the vehicle in order to create a lighted security zone in said area; and*

*said light module including an enclosure having wall means defining a first enclosure cavity, a first light-transmitting opening in said first cavity facing at least one of generally downwardly and rearwardly of said vehicle, said first light-transmitting opening, and a first light source in said first cavity radiating light generally along a first axis through said first light-transmitting opening, said enclosure positioned in an opening in a surface of said housing facing at least one of generally downwardly and rearwardly of said vehicle and said enclosure sloping generally upwardly from said first light-transmitting opening to a location behind said positioning device* including mating surface configurations on said housing and said enclosure which at least partially retain said enclosure in said housing.

69. [The mirror assembly security system in claim 66] *A mirror assembly security system for a vehicle comprising:*

*an exterior mirror assembly including a reflective element, a housing for said reflective element and a positioning device for adjustably positioning said reflective element in said first housing;*

*a light module removably positioned substantially within said housing and wherein a portion of said light module is positioned behind said reflective element, said module projecting light from said housing on at least an area adjacent a portion of the vehicle in order to create a lighted security zone in said area; and*

*said light module including an enclosure having wall means defining a first enclosure cavity, a first light-transmitting opening in said first cavity facing at least one of generally downwardly and rearwardly of said vehicle, said first light-transmitting opening, and a first light source in said first cavity radiating light generally along a first axis through said first light-transmitting opening, said enclosure positioned in an opening in a surface of said housing facing at least one of generally downwardly and rearwardly of said vehicle and said enclosure sloping generally upwardly from said first light-transmitting opening to a location behind said positioning device wherein said enclosure is made from a heat-resistant polymer* including a light-directing surface at least partially surrounding said first light source, said light-directing surface being vacuum-metalized to wall means defining said light-generating cavity.

107. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first unitary light module positioned substantially within said first housing and wherein a portion of said first unitary light module is positioned behind said first reflective element;

said first unitary light module remaining fixed in position when said positioning device adjusts the position of said reflective element in said first housing;

said first unitary light module projecting light from said housing on at least a first area adjacent a first portion of the vehicle in order to create a first lighted security zone in said first area, wherein said lighted security zone includes at least a ground area adjacent a front door of the vehicle;

said first unitary light module including a first enclosure having a first light-transmitting opening;

a first light source in said first enclosure radiating light through said first light-transmitting opening, said first light source being remotely actuated by a vehicle owner approaching the vehicle from a distance, said first light-transmitting opening sealed closed by a first cover whereby light emitted by said first light passes source through said first cover, wherein said first cover is permanently joined to said enclosure at said first light-transmitting opening of said first enclosure;

said first unitary light module removable from said housing as a sealed unitary module; and wherein said sealed unitary module is substantially moisture impervious and wherein said first unitary light module is adapted so as to be removable as a unit for service.

108. The mirror assembly security system in claim 107 including a light-directing surface at least partially surrounding said first light source in said first enclosure.

109. The mirror assembly security system in claim 107 wherein said first cover comprises an optical lens.

110. The mirror assembly security system in claim 109 wherein said lens is selected from the group consisting of a diffusive optic, a diffractive optic, a refractive optic, a reflective optic, a holographic optic, a binary optic, a clear optic, and a sinusoidal optic.

111. The mirror assembly security system in claim 110 wherein said lens comprises a clear optic.

112. The mirror assembly security system in claim 107 wherein said first light source comprises one of an incandescent lamp, a halogen lamp, at least one light-emitting diode, a vacuum fluorescent lamp, and a light pipe.

113. The mirror assembly security system in claim 107 wherein said first enclosure is formed from a heat-resistant polymer.

114. The mirror assembly security system in claim 113 wherein said polymer has a heat distortion temperature of at least approximately 80 degrees C.

115. The mirror assembly security system in claim 113 wherein said polymer is selected from the group consisting of polycarbonate, polyester, nylon, and ABS.

116. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first light module positioned substantially within said first housing and wherein a portion of said first light module is positioned behind said first reflective element;

said first light module remaining fixed in position when said positioning device adjusts the position of said reflective element in said first housing;

said first light module projecting light from said housing on at least a first area adjacent a first portion of the vehicle in order to create a first lighted security zone in said first area;

said first light module including a first enclosure having a first light-transmitting opening;

a first light source in said first enclosure radiating light through said first light-transmitting opening, said first light-transmitting opening closed by a first cover whereby light emitted by said first light source passes through said first cover;

said first light module removable from said housing as a sealed unitary module; and wherein said sealed unitary module is substantially moisture impervious and wherein said first enclosure is formed from a heat-resistant polymer including a light-directing surface at least partially surrounding said light source, said light-directing surface being vacuum-metalized to said first enclosure.

117. The mirror assembly security system of claim 107 wherein said first exterior mirror assembly is a driver-side exterior mirror assembly.

118. The mirror assembly security system of claim 107 wherein said first exterior mirror assembly is a passenger-side exterior mirror assembly.

119. The mirror assembly security system of claim 107 wherein said first cover comprises a non-filtering lens.

120. The mirror assembly security system of claim 107 wherein said first reflective element comprises an electro-optic mirror.

121. The mirror assembly security system of claim 120 wherein said electro-optic mirror comprises an electrochromic mirror.

122. The mirror assembly security system of claim 121 wherein said electrochromic mirror comprises an electro-chemichromic mirror.

123. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first unitary light module positioned substantially within said first housing and wherein a portion of said first unitary light module is positioned behind said first reflective element;

said first unitary light module remaining fixed in position when said positioning device adjusts the position of said reflective element in said first housing;

said first unitary light module projecting light from said first housing on at least a first area adjacent a first portion of the vehicle in order to create a first lighted security zone in said first area, wherein said lighted security zone includes at least a ground area adjacent a front door of the vehicle; and said first unitary light module including a first enclosure having a first light-transmitting opening;

a first light source in said first enclosure radiating light through said first light-transmitting opening, said first light source being remotely actuated by a vehicle owner approaching the vehicle from a distance, said first light-transmitting opening sealed closed by a first cover whereby light emitted by said first light source passes through said first cover, wherein said first cover is permanently joined to said enclosure at said first light-transmitting opening of said first enclosure;

said first unitary light module removable from said housing as a sealed unitary module;

wherein said sealed unitary module is substantially moisture impervious and wherein said first unitary light module is adapted so as to be removable as a unit for service; and wherein said first enclosure is formed from a heat-resistant polymer.

124. The mirror assembly security system in claim 123 including a light-directing surface at least partially surrounding said first light source in said first enclosure.

125. The mirror assembly security system in claim 123 wherein said first cover comprises an optical lens.

126. The mirror assembly security system in claim 125 wherein said lens is selected from the group consisting of a diffusive optic, a diffractive optic, a refractive optic, a reflective optic, a holographic optic, a binary optic, a clear optic, and a sinusoidal optic.

127. The mirror assembly security system in claim 126 wherein said lens comprises a clear optic.

128. The mirror assembly security system in claim 123 wherein said first light source comprises one of an incandescent lamp, a halogen lamp, at least one light-emitting diode, a vacuum fluorescent lamp, and a light pipe.

129. The mirror assembly security system of claim 123 wherein said polymer has a heat distortion temperature of at least approximately 80 degrees C.

130. The mirror assembly security system in claim 123 wherein said polymer is selected from the group consisting of polycarbonate, polyester, nylon, and ABS.

131. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first light module positioned substantially within said first housing and wherein a portion of said first light module is positioned behind said first reflective element;

said first light module remaining fixed in position when said positioning device adjusts the position of said reflective element in said first housing;

said first light module projecting light from said first housing on at least a first area adjacent a first portion of the vehicle in order to create a first lighted security zone in said first area; and said first light module including a first enclosure having a first light-transmitting opening;

a first light source in said first enclosure radiating light through said first light-transmitting opening, said first light-transmitting opening closed by a first cover whereby light emitted by said first light source passes through said first cover;

said first light module removable from said housing as a sealed unitary module;

wherein said sealed unitary module is substantially moisture impervious; and wherein said first enclosure is formed from a heat-resistant polymer including a light-directing surface at least partially surrounding said light source, said light-directing surface being vacuum-metalized to said first enclosure.

132. The mirror assembly security system of claim 123 wherein said first exterior mirror assembly is a driver-side exterior mirror assembly.

133. The mirror assembly security system of claim 123 wherein said first exterior mirror assembly is a passenger-side exterior mirror assembly.

134. The mirror assembly security system of claim 123 wherein said first cover comprises a non-filtering lens.

135. The mirror assembly security system of claim 123 wherein said first reflective element comprises an electro-optic mirror.

136. The mirror assembly security system of claim 135 wherein said electro-optic mirror comprises an electrochromic mirror.

137. The mirror assembly security system of claim 136 wherein said electrochromic mirror comprises an electrochemichromic mirror.

138. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first unitary light module positioned substantially within said first housing and wherein a portion of said first unitary light module is positioned behind said first reflective element;

said first unitary light module remaining fixed in position when said positioning device adjusts the position of said reflective element in said first housing;

said first unitary light module projecting light from said first housing on at least a first area adjacent a first portion of the vehicle in order to create a first lighted security zone in said first area, wherein said lighted security zone included at least a ground area adjacent a front door of the vehicle;

said first unitary light module including a first enclosure having a first light-transmitting opening;

a first light source in said first enclosure radiating light through said first light-transmitting opening, said first light source being remotely actuated by a vehicle owner approaching the vehicle from a distance, said first light-transmitting opening sealed closed by a first cover whereby light emitted by said first light source passes through said first cover, wherein said first cover is permanently joined to said enclosure at said first light-transmitting opening of said first enclosure;

said first unitary light module removable from said housing as a sealed unitary module;

wherein said first unitary module is substantially moisture impervious and wherein said first unitary light module is removable as a unit for service; and wherein a light-directing surface at least partially surrounds said first light source in said first enclosure.

139. The mirror assembly security system in claim 138 wherein said first cover comprises an optical lens.

140. The mirror assembly security system in claim 139 wherein said lens is selected from the group consisting of a diffusive optic, a diffractive optic, a refractive optic, a reflective optic, a holographic optic, a binary optic, a clear optic, and a sinusoidal optic.

141. The mirror assembly security system in claim 140 wherein said lens comprises a clear optic.

142. The mirror assembly security system in claim 138 wherein said first light source comprises one of an incandescent lamp, a halogen lamp, at least one light-emitting diode, a vacuum fluorescent lamp, and a light pipe.

143. The mirror assembly security system in claim 138 wherein said first enclosure is formed from a heat-resistant polymer.

144. The mirror assembly security system of claim 143 wherein said polymer has a heat distortion temperature of at least approximately 80 degrees C.

145. The mirror assembly security system in claim 143 wherein said polymer is selected from the group consisting of polycarbonate, a polyester, nylon, and ABS.

146. A mirror assembly security system for a vehicle comprising:

a first exterior mirror assembly including a first reflective element and a first housing for said first reflective element;

said first reflective element attached to a positioning device for adjustably positioning said first reflective element in said first housing whereby the driver of the vehicle to which said first exterior mirror is mounted can remotely adjust the rearward field of view of said first reflective element;

a first light module positioned substantially within said first housing and wherein a portion of said first light module is positioned behind said first reflective element;

said first light module remaining fixed in position when said positioning device adjusts the position of said reflective element in said first housing;

said first light module projecting light from said first housing on at least a first area adjacent a first portion of the vehicle in order to create a first lighted security zone in said first area;

said first light module including a first enclosure having a first light-transmitting opening;

a first light source in said first enclosure radiating light through said first light-transmitting opening, said first light-transmitting opening closed by a first cover whereby light emitted by said first light source passes through said first cover;

said first light module removable from said housing as a sealed unitary module;

wherein said sealed unitary module is substantially moisture impervious; and wherein said light-directing surface at least partially surrounds said first light source in said first enclosure and wherein said first enclosure is formed from a heat-resistant polymer including a light-directing surface at least partially surrounding said light source, said light-directing surface being vacuum-metalized to said first enclosure.

147. The mirror assembly security system of claim 138 wherein said first exterior mirror assembly is a driver-side exterior mirror assembly.

148. The mirror assembly security system of claim 138 wherein said first exterior mirror assembly is a passenger-side exterior mirror assembly.

149. The mirror assembly security system of claim 138 wherein said first cover comprises a non-filtering lens.

150. The mirror assembly security system of claim 138 wherein said first reflective element comprises an electro-optic mirror.

151. The mirror assembly security system of claim 150 wherein said electro-optic mirror comprises an electrochromic mirror.

152. The mirror assembly security system of claim 151 wherein said electrochromic mirror comprises an electrochemichromic mirror.

* * * * *